United States Patent [19]
Drähne et al.

[11] Patent Number: 5,913,240
[45] Date of Patent: Jun. 15, 1999

[54] METHOD AND DEVICE FOR CONTROLLING SLIP AND/OR FOR DETERMINING THE LONGITUDINAL FORCE OR A FLEX WORK-PROPORTIONAL PARAMETER, AND VEHICLE TIRE THEREFORE

[75] Inventors: Eberhard Drähne, Garbsen; Thomas Becherer, Büttelborn, both of Germany

[73] Assignee: Continental Aktiengesellschaft, Hannover, Germany

[21] Appl. No.: 08/817,340

[22] PCT Filed: Sep. 29, 1995

[86] PCT No.: PCT/EP95/03864

§ 371 Date: Jun. 16, 1997

§ 102(e) Date: Jun. 16, 1997

[87] PCT Pub. No.: WO96/10505

PCT Pub. Date: Apr. 11, 1996

[30]      Foreign Application Priority Data

Sep. 30, 1994  [DE]  Germany ............................ 44 35 160

[51] Int. Cl.⁶ .................................................... B60C 23/04
[52] U.S. Cl. ............................................. 73/146; 73/146.2
[58] Field of Search ..................................... 73/146, 146.2

[56]                References Cited

U.S. PATENT DOCUMENTS 4,815,004  3/1989  Beebe ..................................... 73/146 X

FOREIGN PATENT DOCUMENTS

| 0363570 | 4/1990 | European Pat. Off. . |
| 0393375 | 10/1990 | European Pat. Off. . |
| 3937966 | 5/1991 | Germany . |
| 9005646 | 5/1990 | WIPO . |
| 9114586 | 10/1991 | WIPO . |
| 9325400 | 12/1993 | WIPO . |

Primary Examiner—Joseph L. Felber
Attorney, Agent, or Firm—Robert W. Becker & Associates

[57]                    ABSTRACT

A method for determining a longitudinal force acting during tire rotation on a tire mounted on a wheel rim includes the step of determining the torsional deformation of the tire, which is a function of the location of measurement, between a radially inner area of the wheel or the hub and a radially outer area of the tire in at least one non-rotating position. At least two marks are positioned at the wheel on different radii relative to an axis of rotation of the wheel, wherein a radially outer mark is positioned on a radially outer area of the tire. At least two sensors are non-rotatingly arranged in the vicinity of the wheel so as to be positioned on the different radii, wherein a radially inwardly arranged sensor is connected to a steering knuckle and a radially outwardly arranged sensor is connected to a transverse suspension arm of the wheel suspension. For the rotating wheel at least one time period between passing of the at least two marks at the at least two sensors is recorded. The torsional deformation is computed from the at least one time period. The longitudinal force is calculated from the torsional deformation. Other tire parameters such as tire air pressure, footprint length, tire spring travel, load/pressure ratio can also be calculated with variants of the disclosed method.

51 Claims, 12 Drawing Sheets

$\alpha = 2\pi n \cdot \Delta t_{2,3}$

METHOD AND DEVICE FOR CONTROLLING SLIP AND/OR FOR DETERMINING THE LONGITUDINAL FORCE OR A FLEX WORK-PROPORTIONAL PARAMETER, AND VEHICLE TIRE THEREFORE

BACKGROUND OF THE INVENTION

The invention relates to a method for making possible greatest possible accelerations via frictional engagement and a method for determining the longitudinal force acting on a tire or the tire spring travel or the footprint length or the load/pressure ratio and a device for determining the longitudinal force acting on a tire or the tire spring travel or the footprint length or the load/pressure ratio during rotation and a vehicle tire that is suitable for cooperation with the aforementioned device and/or for the aforementioned method.

A vehicle wheel in the context of this application is to be understood as a combination of all components which, with the exception of small load-depending deformations, are torsion-proof connected to one another and are designed for rotation. A wheel thus includes especially the tire, the wheel rim with wheel flange and wheel rim bowl, the valve, the hub, possibly sealing and/or securing rings attached thereto, brake disks, anti-lock magnet wheels and optionally drive shafts.

The invention is intended to increase the safety level of motor vehicles on wheels that are provided with tires, especially pneumatic tires, that, at least in the longitudinal directions, in general also in the transverse direction (one exception is the famous Metro in Paris provided with pneumatic tires), can transmit forces onto the road etc. only by frictional engagement. In most operational states the maximum possible frictional engagement is not even used; however, wherever it is necessary to react to unpredictable events, for example, a vehicle ahead that has spun out of control or a child running onto the street, so as to prevent dangerous situations, the attainability of great accelerations is required, especially with negative sign, i.e., great braking forces.

It is known that the value of greatest possible acceleration depends substantially on the coefficient of friction between the tires and the street. It is furthermore known, that this coefficient of friction is affected by the paring of the material street/tire, mostly asphalt/rubber mixture, the air pressure, the footprint length, and also the tire tread profile and the weather conditions. Furthermore, it is known that the coefficient of friction is a function of slip. Slip is to be understood as the difference between circumferential velocity of the tire minus steering knuckle velocity, divided by the steering knuckle velocity.

FIG. 1 shows for the conventional frictional material pairing for typical boundary conditions a curve of the coefficient of friction $\mu_{longitudinal}$ as a function of slip, in the following referred to as slip curve. The maximum longitudinal coefficient of friction is reached at a slip of approximately 10%. When the slip is increased further, which could be achieved during braking by increasing the braking moment, the coefficient of friction, together with the effective longitudinal force, would not increase further but, to the contrary, would decrease. This not only would result in the problem that the braking deceleration would decrease instantly, but would also lead to, when maintaining the too high braking moment, the wheel rotation frequency and thus the circumferential velocity of the tire would be reduced quickly to zero (the quicker, the smaller the moment of inertia of the tire—and it is relatively small in comparison to the vehicle mass). The operational state in which the wheel no longer rotates despite still present steering knuckle velocity, is called "locking". The slip is then −100%.

FIG. 2 shows in a solid line the slip curve for the same tire on cold ice (more unfavorable for warmer ice), and, as a comparison, in a thin dashed line the slip curve of FIG. 1 is shown again. The value $\mu_{max}$ is not only substantially lower but also occurs at smaller slip.

The runaway rotational deceleration of the tire occurring during vehicle deceleration, already at slightly increased braking moment, enhances the drawback of the initially only somewhat too great braking slip: It increases quickly from, for example, −14% to −100% in its value. Due to this effect of surpassing the slip, to which the maximum coefficient of friction is related, the area past this slip is often designated by persons skilled in the art as instable slip area. The slip area between 0° and this value is designated as stable. The slip to which the maximum coefficient of friction is related is called critical slip.

The same fact holds true for drive slip that is too great. Spinning drive wheels also effect negatively the safety of the vehicle, even though usually not as badly as braked wheels that lock. Furthermore, in the conventional non-locking differentials, the drive force does not break down, as during braking, for each wheel but for the axle because the greater portion of the drive output is transmitted to the slipping wheel. For non-locking interaxle differentials the drive force would even break down almost completely.

In addition to the decrease of the transmittable longitudinal force, for braking with locking as well as for slipping drive wheels, the vehicle safety in such operational states is impeded by the loss, in the case of locking brakes the complete loss of the ability to transmit lateral forces. The straight running stability is thus only supported by the translatory inertia mass and the moment of inertia mass about the vertical vehicle axis; steering maneuvers are impossible.

Because of the great importance of adjusting the correct slip for the requirement of greatest possible positive or negative acceleration and because of the fact that a human being as a controller is usually only capable of simultaneously maintaining a maximum of two wheels within the optimal slip range, as in the case of a motorcycle, whereby for all other motor vehicles including airplanes, in general, only one actuating device for the entire number of wheel brakes is present, the development of slip control systems, i.e., of systems where a technical device takes over the control function performed by the human being began in the forties of this century, initially only for the braking systems of airplane landing gear. When using such systems, the human being by adjusting the lever pressure, lever travel or pedal pressure or pedal travel etc. only transmits his desire for controlling the nominal value, for example, the brake acceleration.

The control system, on the other hand, has been assigned the tank to adjust for each wheel individually the favorable slip. Most of the slip control systems will only function when at one wheel almost the critical slip has been reached. By preventing a further increase of the brake, respectively, drive moment, locking, respectively, slipping is prevented. Once the critical slip has been surpassed, for example, when the wheel suddenly encounters a worse frictional pairing as for example blue basalt etc., the control system reduces the brake, respectively, drive moment to such an extent and for such a period time until the slip has been adjusted to just below the critical slip.

Slip control devices have been used for approximately 8 years in the mass production of passenger cars, trucks and trailers with increasing market share. Insofar as they control only the brake slip, the acronym ABS (derived from Anti Blocking System) has been used. Slip control systems prove their effectiveness especially impressively under such driving conditions where one wheel track runs on a surface with bad maximum coefficient of friction while the other wheel track runs on a surface with high maximum coefficient of friction.

Slip control systems according to the prior art detect very precisely the actual rpm of each wheel. For this purpose, each wheel is provided with a so-called magnet wheel that on a circumferential line comprises a plurality of marks, the passing of which is detected by a non-rotatingly arranged sensor based on fluctuations of the magnetic flux. From the time interval between passing of two adjacently arranged marks of the magnet wheel, the microcomputer of the control device calculates the wheel rpm and, after multiplication with a stored circumferential length, the circumferential velocity of the tire.

Based on this data the electronic control device calculates furthermore the change of rpm or the circumferential velocity over time.

For detecting the actual slip, each slip control system requires information in regard to the steering knuckle velocity. Since in most operational states of interest the velocity differences between the steering knuckle (curve-inner steering knuckles somewhat slower than curve-outer steering knuckles) are minimal, the slip control systems known to the inventors therefore set all steering knuckle velocities to be equal to the (translatory) vehicle velocity. However, there remains the problem how to determine exactly this vehicle velocity.

For this purpose, the control device also determines, based on the rpm or circumferential velocities of a plurality of wheels at the vehicle, in general, of all wheels, the maximum (during braking), respectively, the minimum (during positive acceleration). Even though out of all wheel rotation information these extreme velocities, respectively, extreme rpm in reality correlate best with the vehicle velocity, but, it must still be considered fictitious as long as it is not measured slip-free, i.e., free of braking and drive moments. Based on this possibly fictitious vehicle velocity, the control device calculates the slip individually for each wheel based on the wheel rotation information of the individual wheels.

When a vehicle over a longer period of time is braked with slip at all four wheels, the possible deviation between the actual vehicle velocity and the aforementioned fictitiously calculated one increases steadily so that the information basis is more and more dubious. When, however, the vehicle velocity can no longer be determined reliably, the system loses the required information for reliable operation in regard to the individual wheel slip, and the quality of the control decreases. This problem exists for drive slip control systems as well as for brake slip control systems when all axles are driven.

These problems can be overcome when in sufficiently short time intervals at least one wheel is made substantially free of moments, and the circumferential velocity of this wheel thus approaches the vehicle velocity (intermittent braking). The time interval of making the wheel moment-free can be shorter when the moment of inertia of the respective wheel is minimal; however, the moments of inertia of wheels in the passenger vehicle field have not been returned due to wider wheels and rims, stronger brakes, and stronger drive joints despite an increasing use of light metal for the wheel rings. Unavoidably, when freeing the wheel of moments, the braking and acceleration capability is wasted.

In addition to the aforementioned comparison of the rotational velocities, it is also known for detecting over-critical slip at a wheel additionally or alternatively, to use the comparison of the rotational accelerations. When at one wheel the value of rotational acceleration surpasses the value of rotational acceleration at the other wheels, this is interpreted as the beginning of locking, respectively, slipping and the braking, respectively, drive moment of this wheel is controlled to a smaller value.

But even with this measuring method problems result when, for example, during the sudden occurrence of an oil stain, all wheels encounter a rotational acceleration that is too great for the instant coefficient of friction. When the rotational accelerations have not yet increased to a value that should not even be reached for $\mu=1$, even an additional program loop with a plausibility control does not help.

It is furthermore known that for some roadway coatings such as ice, snow or gravel up to this time no sufficient slip control has been possible. The slip curves for these conditions deviate greatly from the slip curve for rubber/asphalt represented in FIG. 1. For a more exact understanding of the instantly applicable slip curve the control process could be improved. This would entail the recognition of the roadway coating and an adaptation of the control behavior of the slip control device to the roadway coating.

In summary and abstraction, a problem of the known slip control system is that it employs data for controlling the slip which have been themselves measured under slip conditions. It is a first object of the invention to at least reduce the dependency on slip-dependently measured values, respectively, to preferably overcome it.

Most vehicles driven by frictional engagement use tires which obtain their supporting capacity and their optimal frictional engagement values only by filling with compressed air. When the tire pressure drops below a threshold value depending on the wheel load, the safety is negatively affected by this also. Therefore, many systems for controlling the air pressure have been suggested. They all have the problem that the value to be measured, i.e., the air pressure, is present within the rotating wheel, but the measured value is to be used in a non-rotating system, for example, to be displayed at the dashboard.

Accordingly, all air pressure controlling devices can be divided into two main groups:

In a first group all suggestions are to be arranged where the interior of the tire opens via a channel, penetrating the wheel rim and the hub, with a sliding sealing into the non-rotating steering knuckle and from there opens via a hose etc. into a non-rotating pressure meter. Such systems allow, in addition to the actual measuring, also the correction of a possibly recognized error. A non-rotatingly arranged compressor is able to supply compressed air into the interior of the tire in the reverse direction. The disadvantage of all systems of this group is the limited service life of the pressurized sliding seals and the relatively great leakage flow which not only allows for a compressor but almost makes it necessary to have one for most applications. However, this results in additional weight, increased energy consumption, and a considerably higher purchase price.

In the second group all such suggestions are arranged where the pressure meter is arranged in the rotating wheel and the measured data are supplied to a non-rotating computing unit. This data transmission can be performed with slip rings or by radio transmission. In any case, the expenditure for such an arrangement is great. Slip rings increase the frictional resistance and are subject to wear reducing the service life, radio transmitters require an energy supply into the rotating wheel or an energy source within the rotating wheel, for example, a battery.

It is thus a second object of the invention to monitor the presence of sufficient air pressure in a simple and reliable manner.

SUMMARY OF THE INVENTION

The first object is solved in that the longitudinal force acting on the tire is determined and input into the control system. The suggested novel detection of the longitudinal force allows the determination of the actual position on a slip curve not only, as known previously, based on the abscissa, i.e. based on the actual slip value with all aforediscussed problems in regard to the required determination of the vehicle velocity, but based on the ordinate. The measured longitudinal force of the tire divided by the wheel load results in the current frictional coefficient $\mu$, i.e., the ordinate of the slip curve.

The precision with which the ordinate, i.e., currently used $\mu$, can be determined, depends not only on the precision of measuring of the longitudinal force, but also on the precision of the determination of the wheel load. Accordingly, the wheel load of each wheel is preferably measured also. This is universally possible with a piezo crystal ring between the steering knuckle and the inner bearing ring which must detect the deformation in the vertical direction of the vehicle. On axles without transverse suspension arms it is especially easy to determine the wheel load at the spring element, for example, by expansion measuring strips at the predominately used steel coil and torsion spring arrangements, and for air springs by measuring the respective air pressure. Measuring at the spring element is also possible for axles with transverse suspension arms when additionally also its wheel load component is measured and added at one side and subtracted on the other side of the same axle.

The newly suggested measuring of the longitudinal force can also be carried out with an optionally additional piezo crystal ring between the steering knuckle and the inner bearing ring which, however, would have to determine the deformation in the horizontal direction of the vehicle.

Furthermore, a wheel-individual longitudinal force measurement is possible by measuring the bearing reaction forces at the connecting locations of the longitudinal swinging arm or by attaching expansion measuring strips to the longitudinal swinging arms. On axles with triangular transverse suspension arms, the measurement of the two reaction forces occurring substantially in the axial direction of the vehicle, for example, is possible, preferably with a piezo crystal ring at least between a bolt at the car body and a corresponding eye, i.e., the outer bearing ring of the transverse suspension arm. Multiplied by the axial length of the triangular transverse suspension arm and divided by the distance in the longitudinal direction of the vehicle between the two suspension locations of the triangular transverse suspension arm at the car body, the longitudinal force results also, at least in the especially important case of wheel turning angles of substantially zero.

In short, a longitudinal force measurement as well as a wheel load measurement are possible very exactly and reliably over an extended period of time because all required measured values can be taken at parts that will perform only finite pivoting movements but do not rotate endlessly, i.e., they do not rotate. The longitudinal force measurement allows, preferably combined with a wheel load measurement, an exact determination of the coefficient of friction $\mu$ currently used.

One could object to the suggested position determination on the slip curve because only the function of $\mu$ over the slip is defined unequivocally while the inverse function, slip over $\mu$, in most ranges of the values is ambiguous, i.e., most values of $\mu$ have correlated thereto an undercritical and an overcritical slip, however, such an objection carries no weight for a plurality of reasons:

Firstly, the known slip control systems also operate reliable only as long as at least one wheel is within the undercritical range, and in this range the inverse function is also defined underunambiguously.

Secondly, from the sum of all wheel loads the total vehicle mass can be deduced easily, and the actual vehicle acceleration results very precisely from the sum of all measured longitudinal forces divided by the total vehicle mass. Based on this, the slip-free corresponding rotational acceleration for all wheels is determined. This information opens a plurality of possibilities, especially:

a) The new method is combined with the known methods and allows, even for extended braking actions or all wheel accelerations, an improved plausibility control of the actual wheel rotation accelerations.

b) While maintaining the conventional rotational velocity determination and the deduced rotational acceleration computation, the braking and drive moment is controlled such that the measured wheel rotation acceleration coincides at least in approximation with that determined based on the vehicle acceleration.

Thirdly, an oscillation overlap of the initially selected brake line pressure selected by the driver is to be recommended which, apart from the critical point of the slip curve, must appear in a periodic fluctuation of each wheel longitudinal force. In the stable range, also called undercritical range, a brake line pressure increase results in a determinable trailing longitudinal force increase that is of a short duration and, while in the instable area, also called overcritical area, the reverse relation results, or, for certain street coatings, there is no correlation to be observed. The amplitude of the brake line pressure fluctuation can be selected to be astonishingly small in relation to the brake line pressure which corresponds to the maximal suitable brake moment, preferably 3% to 6%. The thus effected brake line loss is substantially smaller than in previously known systems using intermittent braking.

In combination with the known slip control systems it is furthermore possible by data comparison of both measuring methods to quickly adapt automatically the applied slip curve to the actual conditions: For example, when a conventional slip control system adjusts a slip of 9%, in expectation of reaching $\mu$ of approximately 0.85, and when the longitudinal force measurement detects for example a $\mu$ of only 0.3, then it is obvious that another slip curve must be used. It is possible to store in the evaluation unit a plurality of slip curves and to automatically select, when such a situation occurs, the best suited curve for each wheel. However, in combination with the previously known slip control systems it is also possible via the wheel rpm measurement to update continuously the applied slip curve with a directed measurement of characteristic value pairs of the slip and $\mu$, for each wheel individually.

Summarizing the above description, the suggested longitudinal force measurement allows, preferably in combination with a wheel load measurement, in combination or alternative to the previously known wheel rpm measurement, a secure control behavior for extreme driving conditions that are especially safety-relevant.

The inventors have furthermore recognized that the longitudinal force cannot only be determined at the interface of the wheel suspension but also from the deformation of the respective tire. This appears to be especially attractive because especially a pneumatic tire can be viewed as a spring element so that the resulting deformations are greater than at the elements of the wheel suspension. Thus, in principle, an excellent measuring precision is possible.

Based on this—new—recognition, the inventors have thus selected as a further object to provide a method which measures the acting longitudinal force as directly as possible at the tire.

The measuring location tire appears to be attractive insofar as the current coefficient of friction $\mu$ can be detected free of braking forces which allows for an especially fast control. However, the faster the control (and the greater the movement of inertia of the wheel), the more controllable the instable slip range, and it becomes possible that the average over time of the slip achieved by the control coincides with the critical slip and must not as previously maintain a "safety distance" which results in a longer braking distance on an ideal street with slip-controlled systems than without.

The present invention further to determine the longitudinal force acting on the tire as a result of the torsional deformation of the tire, that depends on the position of a plane containing the measuring elements and extending perpendicular to the rotational axis, between a radial inner area of the wheel and a radial outer area of the wheel belonging to this tire in at least one non-rotating position. According to the present invention the thus determined longitudinal force is to be used in a slip-control method for allowing greatest possible positive and/or negative accelerations of the vehicle.

However, the measuring location tire in the past was not an option because, in contrast to undercarriage parts, it rotates, so that there is the problem of transmitting the data error-free, reliably over an extended operation period, and inexpensively into a non-rotating evaluation, display, and optionally intervention unit. As explained in the following, "during the tire rotation" the detection of a certain deformation type can be performed without encountering this problem.

When the local torsional deformation is measured only at a single location, which is sufficient for longitudinal force determination, then this should be the position above the rotation axis in the vertical direction of the vehicle. This location in the following is designated as 0°. For the local torsional deformation in the context of this application the term tire deformation is also used.

For explaining the measuring principle it should first be assumed, greatly simplified, that the normal force required for the frictional force build-up not only occurs within the closely defined footprint, which would be corresponding to the facts, but also over the entire tread surface. Then, the tread surface would have no need to deform to a non-round surface or to adopt at any location an eccentric shape. However, a rotation between the tire tread surface and the tire bead would still occur. (To be precise, a rotation between the wheel rim flange and the hub would also occur, however, this rotation is substantially smaller due to the substantially greater stiffness of the metals.) This effect is especially noticeable for the currently predominant construction of pneumatic tires, i.e., with a torsion-favoring radial carcass and a pulling and pressure resistant package of belt plies.

The rotational angle increases exactingly monotonously as a function of the torque causing the rotation. This relation is surprisingly close to a linear function.

According to the second object the sufficient level of air pressure is to be controlled, preferably as an additional measure. The inventors have realized that for this purpose the measurement of the air pressure is unnecessarily complicated and provides unnecessarily weak information:

A somewhat lower air pressure than suggested in the owner's manual for normal load conditions can be without consequence for extremely low loads. On the other hand, even the normal air pressure can be too low for extremely high loading with the result of great tire flex work and thus too great tire heating and polymer degradation resulting therefrom. A control only of the air pressure would leave unconsidered the dependence of the required air pressure from the wheel load.

The inventors have recognized that for monitoring the safe operation of a pneumatic wheel the flex work per revolution should be determined. It is almost proportional to the spring travel of the tire as well as to the footprint length and also to the ratio of the received wheel load to the tire air pressure, in the following referred to as load/pressure ratio.

For solving the second object they suggest according to claim 6 to determine a parameter that is approximately proportional to the flex work per revolution in that this parameter, i.e., the spring travel of the tire or the footprint length or the load/pressure ratio, is determined based on the position-dependent torsional deformation of the tire between a radially inner area and a radially outer area of the tire in at least two (of course, separate) not-rotating positions. Preferably, positions of approximately 180° are avoided. Especially preferred are position pairs of 0° and 90°, 90° and 270° as well as 270° and 0°. Here, the data processing is especially simple, as will be explained in the following:

Coming from the thought experiment longitudinal force transmission without wheel load, as explained above, now the discussion revert to the—realistic—normal force introduction within the footprint alone:

It is clear that a rotation between the radially outer and radially inner area of the tire due to a braking or drive torque must occur, however, overlapped with deformations based on the non-uniformly distributed wheel load action. For simplifying the explanation now a second attempt: Wheel load introduction without longitudinal force (this case is even realistic, especially for braking-free and drive-free rolling):

The wheel load action at the tire tread surface not only results in a tread surface flattening within the footprint but also, especially in conjunction with belt layers combined so as to be pulling and pressure stiff, in a tread surface deformation within the remaining periphery of the tire: Aside from small areas of the footprint leading edge and trailing edge and, of course, of the footprint itself, the remaining tread surface area maintains substantially its circular shape, but substantially displaced eccentrically to the rotational axis in the upward direction by a small amount that is proportional to the wheel load. This deformation amount appears in the 0° position as a pure "pull", i.e., as a deformation to a greater radius from the rotational axis, in the 180° position as a pure pressure, and in the position 90° and 270° as a displacement in the circumferential direction which, as a phenomenon, is not to be discerned from the local torsion. However, while torsion resulting from torque without wheel load will appear uniformly over the entire circumference with respect to amount and orientation, the torsion due to wheel load without torque will be similar to a sign oscillation. In the 0° position (pull) it is 0 (therefore, when measuring in only one position, deducing from here the acting torque, respectively, the longitudinal force), in the 90° position depending on the sign definition it is a positive or negative maximum, in the 180° position (pressure) it is again 0 (however, here is a risk of damage by curbs etc.), in the 270° position it is the maximum of same amount as in the 90° position but with reverse sign.

Especially preferred is the position combination 90° and 270° because the flex work proportional value is then the difference between the two measured values (which corresponds to an addition of two approximately identical values because one of the two values has a negative sign) and because of the especially great total signal in comparison to the unavoidable measuring errors.

The different parameters, wheel load on the one hand and flex work-proportional parameter on the other hand, effect easily discernable local torsion deformations in different positions. They fulfill very well the rules of a linear superposition. In the last discussed 90°/270° position combination, for example, the longitudinal force results from the sum of the two measured values, the flex work-proportional parameter from the difference.

With the exception of the combination 0°/180° any other position combination is possible for the determination of the longitudinal force as well as for the flex work-proportional parameter by programming the above-described sign-shaped angular relations into the evaluation unit. Preferably, a method with torsional measurement in two positions serves not only for the determination of one of the two parameters longitudinal force and flex work-proportional value but for both.

When in even more positions measurements are performed, the thus resulting redundance can be used for determining the desired parameters with different means. This results not only in a lowering of the failure probability but also allows—as long as not too many sensors will fail so that no redundance is present anymore—an averaging of the results determined in different ways in regard to the same parameter, so that the precision of the final results can be further increased. Furthermore, upon surpassing of a preselected difference between the results measured in different ways for the same parameter, a warning display of a functional failure at the dashboard is suitable.

The above explanations show that the measurement of the local tire torsion is suitable for determining the longitudinal force as well as for monitoring the respective required air pressure. It appears to be especially elegant that such a measuring method can take care of both tasks at the same time.

The value of the torsional deformation can be determined, for example, by measuring the transverse strain in a surface extending in the circumferential direction. However, the respective sensors are difficult to place. Furthermore, it is complicated to transmit the relatively weak measured signals from the expansion measuring strip from the rotating wheel to a non-rotating evaluation and display or intervention unit.

The inventors therefore see a further object in that the torsional deformation is to be described with such physical parameters which with minimal expenditure can be measured sufficiently precisely and which can be transmitted easily and reliably into a non-rotating unit.

This object has also been solved, in particular with a further development of the previously disclosed method, especially in that the torsional deformation is determined based on one or a plurality of time period measurements whereby the time period(s) to be measured between passing of at least two marks positioned at different radii to the rotational axis at the rotating wheel, whereby at least the radially outer mark is positioned at a radially outer area of the tire, across at least two non-rotating sensors positioned on the corresponding radius to the rotational axis.

A device suitable therefore is taught in the present invention.

The radially inner sensor or sensors can be arranged for radially inwardly, even—and this is even attractive—on the cylinder mantle surface or a collar (the projecting opposite to a groove) of the steering knuckle. The cooperating mark(s) must then be positioned in or at the hub, for example, integrated into the sealing ring.

Of course, the radially inner mark(s) can also be positioned further radially outwardly, for example, in the vicinity of the wheel flange positioned inwardly relative to the vehicle as long as a sufficient radial distance to the radially outwardly positioned mark(s) remains because the measuring signals are greater when the radial distance, through which a respective radial extends, the phase position of which relative to one another is inventively determined. It is essential that the sensor or sensors are positioned on the same radius of the rotational axis as the cooperating mark(s).

For some wheel suspensions it is recommended for reasons of simplicity to arrange the outer sensor(s) at the transverse suspension arm(s) of the wheel suspension.

The measuring principle is based on the radially outwardly arranged mark(s) passing with a delay of a time difference delta t for positive acceleration, the cooperating sensor(s) in comparison to the point(s) in time of passing of the radially further inwardly arranged mark(s) across their respective sensor(s). For a negative acceleration, i.e., for braking, the outer mark(s) pass the corresponding sensor(s) correspondingly earlier or, expressed in reverse, the inner mark(s) pass at a later time.

For a more detailed explanation in conjunction with FIGS. 3a through 3d a simple case is discussed as an example, in which a pair of sensors 4 and 5, shown only as a small square, are rigidly arranged in the 0° position, i.e., in the vertical radial line with respect to the vehicle above the rotational axis, and two cooperating marks 2 and 3, indicated by a small circle, on corresponding different radii R2 and R3 at the rotating wheel.

The two marks in this example are not positioned on a common radial line (when considering the extension in the axial direction, this is more correctly called also "phase plane"). In contrast, they are displaced relative to one another by the differential angle D which in the shown embodiment is 30°=pi/6. For a constant rpm n=1/T, whereby T is the period time, i.e., the time for one revolution of the wheel, the time span between passing of the leading mark 2 at the sensor 4, which is shown in FIG. 3b, and passing of the mark 3 at the sensor 5, which is shown in FIG. 3c, is in general $$t_{2,3} = T \times D/2pi, \text{ i.e., in this case } T/12.$$

When, for example, caused by a negative acceleration, i.e., an acting brake moment, the inner mark 2 is displaced to the rear by an angle Alpha about the axis of rotation RA relative to the orientation of rotation, this results in an extension of the time span $t_{2,3}$ by the amount $$\text{delta } t_{2,3} = T \times Alpha/2pi = Alpha/(2\ pi\ n).$$

Thus, the fluctuation of the result of the time span measurement correlates in this example with the local torsion angle Alpha.

When, which is most important for the measuring of the parameter relating to the flex work, it is also taken into consideration that the local torsional angle Alpha changes somewhat across the shown 30° interval, it must be said that the fluctuation of the time span $t_{2,3}$ does not correlate with the torsion angle Alpha itself but with its average value in a linear fashion in the position, here 15°, between the beginning and the end of the time span measurement. When it is desired to have an optimal correlation to the torsional deformation in the 0° position, it would be advantageous, for an otherwise unchanged example, to slant the common phase plane of the two sensors by 15°. The pilot production devices tested so far only need a mark difference angle of 3° (However, the actual conditions could not have been properly shown) so that even without consideration of these minor details the resulting measuring results reflect reality extremely precisely.

As stated already in the above explanations, the torsion angle Alpha correlates, in turn, as a function of the selected non-rotating measuring locations, with the longitudinal force to be measured, respectively, the parameter based on the flex work. Thus, it is shown that and in which manner the time span measurement is suitable for determining one or both desired parameters. Also, the required devices are disclosed to such an extent that the average person skilled in the art is able to construct devices suitable for performing the method, especially because time measuring circuits are known in the prior art, also from the conventional slip measuring systems.

The decisive difference to the latter is that the inventive device not only comprises radially inwardly positioned marks with a corresponding sensor, but also comprises at least one radially outer mark whereby between the radially outer mark(s) and the radially inner mark(s) a component of significant torsional softness is arranged, preferably at least a part of a tire sidewall.

In comparison to conventional systems the advantage lies in a higher reliability even under difficult conditions. In contrast to a device measuring the deformation travel or the deformation tension in the rotating wheel, the advantage is that the measured data from the beginning are sensed non-rotatingly, so that there is no need for any error-susceptible and/or expensive data transmission from a rotating to a non-rotating sub system. In this regard there is a similarity to the conventional slip control systems.

A further advantage of this method is that time span measurements, in comparison to tension measurements, angular measurements or length measurements, have an especially advantageous relation between precision, long service life, and reliability, on the one hand, and purchasing costs, on the other hand.

As an explanation of the operation the aforementioned equation $$\text{delta } t_{2,3} = T \times Alpha/2pi = Alpha/(2\ pi\ n)$$

is solved for Alpha. It reads then:

$$Alpha = (2pi/T) \times \text{delta } t_{2,3}$$

or $$Alpha = 2\ pi\ n \times \text{delta } t_{2,3}.$$

In order to define the longitudinal force and the flex work-depending parameter, when this is to be done very precisely, calibrating functions must be stored and used in the evaluating unit which calibrating functions are exactingly monotonous. First attempts, however, have shown that already with a simple proportional factor, corresponding to a linear calibrating function, an astoundingly high measuring precision can be achieved. When it is desired to determine even more precisely the, in general, slightly progressive, calibrating function and use it, then this is a routine measure known to the person skilled in the art.

In summarizing the above explanations, it is important that a) in a radially outer area of the tire belonging to the wheel the point in time (points in time) of passing of one or more marks arranged at the tire across the at least one outer non-rotating sensor must be registered, in the following called the outer point or points in time, and b) in a radially farther inner area of the wheel, the point in time (points in time) of passing of one or more marks positioned at the wheel, for example, within the tire bead area or at the rim or, preferably at the hub, passing across at least one inner non-rotating sensor must be registered, in the following called the inner point or points in time, and, c) the time period or time periods between the outer point or points in time and the inner point or points in time must be measured and evaluated d) whereby the evaluation includes a division of the time period or periods measured according to c) by the period length T to be determined also, whereby the period length corresponds to the time period for a revolution of the wheel or a certain fraction thereof.

It is possible that passing of an inner mark across an inner sensor triggers a respective time period measurement, preferably with an electronic timer, and that passing of an outer mark across an outer sensor stops this time period measurement. However, the opposite is possible in that the passing of an outer mark across an outer sensor initiates a time period measurement, preferably with an electronic timer, and the passing of an inner mark across an inner sensor stops the time period measurement.

That one of the passing actions should stop the time period measurement that has the smaller probability of error because then the probability of erroneous time period measurements is minimized. In such an error scenario there would not be provided an erroneous but instead no measurement signal. This allows a simple error recognition and avoids false results.

An arrangement of inner marks and sensors in the area of the hub, especially in the well-protected hub itself, appears to lead according to past experiences to an extremely minimal error probability. Thus, in such an arrangement, the stopping function should be provided inwardly. However, when the inner marks and the sensors are arranged in the area of the wheel rim flange, their function appears to provide a greater error probability (for example, rim flange damage by fast traveling across curbs) then the cooperation of the outer mark and sensors. Accordingly, the first described functional distribution is to be recommended.

As mentioned before, the differential angle between a pair of marks in this application is indicated with "D". In the example according to FIGS. 3, D was 30°. However, a different differential angle between the phase plane of the sensors of a sensor pair is possible. This is indicated in this application with "d". This angle d was set to be 0° in FIGS. 3 for simplifying the explanation. However, since for achieving favorable costs for the inventive device the required sensors would be placed onto parts of the wheel suspension that are already present, such a sensor pair differential angle would most likely not be 0. The equation given on page 21 at the end of the second paragraph $$t_{2,3}=T \times D/2pi$$

is to be generalized for d not 0 such that $$t_{2,3}=T \times (D-d)/2pi.$$

It has been explained that the measuring precision is especially high when D as well as d are close to 0, in the extreme case are equal to 0. In this case, as in any other case with D–d equal 0 the time period $t_{2,3}$ to be measured is equal to 0 for a scenario free of moments. When it is preset that the outer mark 2 triggers the time period measurement and the inner stops it, then at a position of 0° of the sensor pair, in the case of braking, a time period $t_{2,3}$ equal delta $t_{2,3}$ almost proportional to the value of the brake moment and thus to the value of the longitudinal force is measured, for a maximum load approximately 1°.

For the case of positive acceleration, on the other hand, the complete period length T is provided. Because in the comparison to the much longer, approximately longer by the factor 360, period length, the difference to T as an absolute value, which is of interest only, is almost inconsequential, such a measuring result would thus be unsuitable for controlling the drive slip. Furthermore, the lack of an orientational indication (+ or −) in this case, when no other provisions are made, would not detect a driving longitudinal force but erroneously an exorbitantly high decelerating longitudinal force. Similar problems are present when the torsional deformation for the determination of the flex work-depending parameter were to be determined at the rearward wheel half, viewed in the driving direction, for example, in the 270° position.

The inventors have thus been faced with the further object of improving the aforementioned methods and devices such that the torsional deformations can be detected precisely in both orientations of rotation by time period measurements.

Two alternative solutions are provided for this.

The second solution is characterized in that the time period between passing of the marks 2 and 3 as well as between passing of the marks 3 and 2 are measured and of the two measured time periods one is provided with a positive and the other with a negative sign, and of both time periods the one of a smaller absolute value will be used. When applied to the aforementioned example, in the previously problematic scenario a torsional deformation of −1° would be detected instead of a deformation of 359°.

The sign definition could also be reversed, it is only important that the orientational change of the parameter to be measured corresponds to an orientational change of the measuring result.

The advantage of this method improvement is that D−d may be set to 0, especially also D=0 and d=0. With this, the absolutely greatest possible measuring precision is achieved. Furthermore, the sign-containing measuring result can be especially easily interpreted. However, the measuring expenditure is in principle twice as high as in the second solution to be explained in the following.

The second solution uses the fact that even the maximum occurring torsional angle values that are responsible for the detected time period changes and are within a range of 1°, are small in comparison to the complete angle. In summarizing briefly, a sufficiently great offset is adjusted by correspondingly placing the marks and sensors, for example, 2°, so that under all circumstances the measured time period changes are free of sign changes, in the aforementioned embodiment are between 1° and 3°; 1° could, for example, belong to the maximum braking longitudinal force, 1.5 to a conventional braking longitudinal force, 2° to freedom of longitudinal force, 2.5° to a conventional forward drive force, and 3° to the maximum possible forward drive force.

In more detail: The differential angle (D) of a pair of marks, comprised of an inner and an outer mark, is defined as the angle between the phase plane of one mark and the phase plane of the other mark, whereby the phase plane of a mark is defined as the plane containing the axis of the wheel in which the respective mark is arranged on the wheel. The differential angle (d) of a sensor pair, comprised of an inner and outer sensor, is defined as the angle between the position plane of one sensor and the position plane of the other sensor, whereby the position plane of a sensor is defined as the plane containing the wheel axis in which the respective sensor is non-rotatingly arranged.

Based on this, the method improvement is characterized in that for avoiding time periods of different sign the differential angle (D) of the pair of marks deviates from the differential angle (d) of the pair of sensors at least by the rotational angle between the outer and inner area under maximum wheel load so that of the designated pair of marks only a certain mark, i.e., either the inner or the outer mark, triggers the time period measurement and the other mark, i.e., the outer, respectively, the inner mark, stops the time period measurement. Preferably, one of the two differential angles (either D or d) is set to be zero.

In principle, it is already sufficient to arrange a single pair of marks on the wheel to be monitored. Insofar as the marks must be arranged additionally at the tire, respectively, at the wheel, this lower extreme has the advantage that the expenditure is minimal. However, the resolution over time is relatively bad. Thus, it is recommended to use such measurement only for wheels operated at extremely high rpm, for example, the relatively small wheels of a landing gear of fighter planes with take-off velocities of approximately 350 km/h.

A better resolution of the determined longitudinal force and/or the flex work per revolution (i.e., tire spring travel or footprint length or load/pressure ratio) results with a method improvement, according to which a plurality of pairs of marks are arranged on the wheel. Preferably, each sensor pair should then measure per wheel revolution a plurality of changing time periods between the passing of the two marks of each pair comprised of an inner and an outer mark.

In view of the fact that the angle distances of one load extreme to the other are approximately 2°, for a simple avoidance of a mixup (that the mark of one pair is falsely interpreted as the mark of a neighboring pair) the number of pairs of marks should have 180 as an upper limit. It is even more recommendable when for the purpose of greater safety with regard to mixups at both ends a safety distance of 0.5° is maintained, i.e. for each pair of marks a range of 3° is kept free. The especially recommended upper limit for the number of mark pairs is thus 120.

The processing of this number of measured values is simplified when, each of the mark pairs has the same differential angle. (For this purpose, it is possible, but not required, to distribute the marks uniformly about the respective circumference. For a non-uniform distribution in one of the two sets of marks, the other set of marks must have the same non-uniformness so that the phase relation within each pair of marks is identical. Both are variants of the inventive device However, this is not a necessary requirement.

When, for example, for reducing costs or for increasing the reliability, a separate application of marks at the tire within the outer range is to be avoided, which is to be recommended for mass production, it is possible, according to a further embodiment of the teaching, that a number of wire ends of a belt ply could be extended in, preferably uniform, circumferential distances at least on the tire side I which with respect to the vehicle faces axially inwardly, and that these projecting wire ends could be reliably detected with sensors, which respond to a change of the magnetic flux density.

In a non-uniform distribution of the mark pairs, this would result in the advantage that for each measured value exactly the corresponding rotational position of the wheel could be detected. This would allow for the additional detection of out-of-round or imbalance of the wheel. Furthermore, this allows for considerable simplifications in the design of the devices suitable for the method:

Most vehicle tires have transverse grooves in the tread strip profiling. The edge portion of the tread strip profiling, which is often called "side decoration" and during normal driving conditions is not in contact with the road surface but is subjected to surface contact only upon a slanted approach on curbs, has often, for improving the curb climbing ability, also transverse grooves, i.e., grooves not extending in the circumferential direction, which are arranged, primarily for reasons of stylistic consequences and the desired wide appearance of the tire, in alignment with the transverse grooves of the main area of the tread strip which under normal driving conditions is in contact with the road surface. Accordingly, the transverse grooves of the side decoration are not provided in uniform division, but according to the pitch sequence of the tread strip main area provided for reasons of noise reduction.

Especially in cooperation with sensors for the outer marks, that detect optical signals, for example, respond to a change of light reflection of the object observed, the transverse grooves of the side decoration could be used as outer marks (2). Thus, no additional, not even a changed, component would be required at the tire.

Such an approach would also be possible, of course, when somewhere within the tread surface main area and not within the side decoration, a detectable, preferably optically, transverse groove sequence would be present. However, the tire-near attachment of the outer sensor or sensors, due to the greater length of the connecting part between the steering knuckle and the sensor, in the following called "outer sensor carrier", would be more complicated. Furthermore, the sensor carrier would be heavier and thus more prone to oscillation.

When it is desired to proceed such that despite the non-uniform distribution of the mark pairs within each one of the mark pairs the differential angle is identical, both mark tracks (also called mark sets) must be fine-tuned relative to one another such that the inner mark track has exactly the same non-uniformness as the outer mark track. Since there is a great number of different pitch sequences, even within the tire types for a certain vehicle, in such a case it is recommendable to mount not only the outer mark track but also the inner mark track at the tire, the latter preferably within the bead area, because in this way complicated communication between the tire and the vehicle producer for the purpose of matching can be avoided.

However, this would result in a more expensive tire. It is thus more advantageous to use also as inner marks such wheel parts that are already present. In any conventional slip control system a magnet wheel with a plurality of poles that are however uniformly distributed is present at each wheel. By abandoning a constant differential angle of all mark pairs, it is possible to use as outer marks the (usually non-uniformly distributed) transverse grooves of the tire tread profile, especially of the side decoration, and to use as inner marks the (uniformly distributed) poles of an already present magnet wheel.

However, the processing unit must then be provided with more storage and computing capacity and must first determine the mark distribution for example, with statistical computing programs or by comparison with data of a conventional slip control system, must have the mark distribution therein.

An extremely high number of mark pairs and the thus possible extremely fine resolution of measuring of the longitudinal force and/or of the flex work-depending parameter thus possible over the rolling distance of the vehicle results, in view of the unavoidable sluggishness in the brake and/or drive moment adjustment, only at low velocities or very great wheel diameters in a precise slip control behavior. On the other hand, velocities below 20 km/h are hardly of interest because the braking distance at these velocities is very short anyhow, even without use of slip control systems. Thus, there is no noticeable improvement when for passenger cars the number of mark pairs is increased to more than 40 and for trucks is increased to more than 80. It is thus preferable, in order to avoid excessive costs, to limit the number of inner marks, which in most cases require separate application at the wheel, to these numbers. Especially when the inventive methods and devices are used not alternatively but in addition to the conventional slip control systems, which is especially favorable, the conventionally toothshaped poles of the conventional magnet wheel can be used as the inner marks. The conventional pole number is in the same range as mentioned above. The one of the inventors is 24 and 96.

The conventional number of detectable transverse tire grooves at passenger cars is between 61 and 79. When it is assumed that a passenger car has a magnet wheel with 44 poles and the mounted tire has 67 transverse grooves, it is still possible to use the transverse grooves of the tire as outer marks when the processing unit of the slip control system has a selection program which selects the most suitable marks for mark pair formation. This entails especially the elimination of outer marks, i.e., a reduction of the number of marks that is too great. However, there are also exceptions in which it is expedient to eliminate a small number of marks from the smaller set; for example, 25 outer and 2 inner marks could be eliminated in the processing. Such exceptions are more probable when the pole distribution on the magnet wheel is also non-uniform which, however, has not been realized in the past.

Truck tire profiles are, in general, more coarse. Typical transverse groove numbers are, despite the greater wheel diameter, in the range between 35 and 60, in general, approximately 45. There are slip control systems for trucks with magnet wheels of greater pole number. In such cases, in contrast to the above discussed case, inner marks are to be eliminated.

Any elimination, independent of whether it is an inner or outer mark, is expediently carried out such that the mark pairs are formed so that under all load conditions time periods free of sign change are measured.

It has already been explained in detail in which non-rotating positions or position combinations which local torsion or torsions as a function of the target parameters longitudinal force and/or flex work-depending parameter will occur and, in reverse, can be determined from the torsion angles.

Since the measured time period changes are exactly proportional to the torsional angles, the aforedisclosed also is valid for the preferred method and device improvements with measurement of time period changes. In order to be able to determine both target parameters, a plurality of sensor pairs are arranged non-rotatingly in the vicinity of the wheel in different position planes. Then, each mark pair passing these different sensor pairs effects thereat a time period measurement beginning with the passing of the leading mark of this pair to the passing of the trailing mark of this pair. The position combination 90°/270° upon using two sensor pairs is preferred because of the greater signal values in measuring the flex work-depending parameters and because of simpler and thus much faster as well as less cost intensive data processing within the processing unit. Furthermore, this position combination also allows a precise and data-technological simple (only one addition is required) determination of the longitudinal force. According to another preferred embodiment both measuring possibilities should be used. Accordingly, the especially preferred devices are characterized by an arrangement of all four sensors on a sensor carrier attached to the steering knuckle on a common horizontal line of the vehicle. The correlated FIGS. 6 and 7 show such an arrangement.

With especially minimal error probability and especially minimal expenditure the longitudinal force can be determined with an arrangement of a single sensor pair in the 0° position, i.e., on a vertical line of the vehicle extending through the axis of rotation. An especially high precision is achieved by arranging two sensors on a sensor carrier fixed to the steering knuckle and extending upwardly. Such a device is shown in FIG. 4.

Preferably, a further sensor (10) is fixedly connected, preferably in the 90° or in the 270° position, to the steering knuckle that is responsive to the outer marks and determines the axial distance between it and any mark passing it. This allows for a measurement of the transverse force of the tire especially precisely when a further distance measuring sensor is arranged in the 0° position. A transverse force measurement is meaningful when an emergency braking action is performed not on a straight course but in a curve.

On a straight course in such an emergency situation the maximum possible frictional value should be used for deceleration. However, as a consequence, the ability to transmit transverse forces becomes very small. When the device, however, as preferred, is able to detect by transverse force measurement at each wheel an increased need of transverse force transmission ability, it can reduce the adjusted slip, however, taking into account a reduced longitudinal force transmission, to such an extent that this need is satisfied, i.e., the vehicle remains steerable. Even though an increased braking ability in front of a suddenly appearing obstacle already increases the active vehicle safety substantially, an ensured evasive ability increases this safety even further in most emergency situations. When the obstacle appears on a straight course, maintaining full stirrability would mean accepting a longer braking distance. Of course, the transverse force could also be measured at a transverse suspension arm or at another component acting in the same manner, for example, a longitudinal extending leaf spring of a truck.

For reducing the unsprung mass it is, in contrast to the device shown in FIG. 4, at least as long as no great wheel turning angles occur, also possible to connect the sensor carrier to the car body. Such a device is shown in FIG. 5.

When, as shown therein, both sensors are arranged on a sensor carrier mounted at the car body, it is necessary, in order to avoid mixups, for example, that the exterior sensor upon great spring travel does not detect passing of an inner mark, that either one of the further requirements that the radial distance between the sensor and between mark tracks is greater than the spring travel of the wheel suspension, or that the passing of the marks of one track is detected by a different physical effect than the passing of the mark of the other track, for example, the outer mark could be optically detected and the inner mark electromagnetically detected must be fulfilled.

Furthermore, it would be possible to mount only the outer sensor at the car body and to mount the inner sensor at the steering knuckle, preferably at the mantle surface of the steering knuckle and, accordingly, the marks of the inner track within the wheel hub. The cooperating inner marks and the respective sensor thus contribute only minimally to the unsprung mass and mixups between the inner and outer marks, even when using the same detection effect, are prevented.

However, with an arrangement of only a single sensor pair in any desired arrangement it is not possible to determine the flex work-dependent parameter value. For this purpose, at least two sensor pairs are required. Thus, a combination of two different measuring positions for sensor pairs is taught, in particular the aforementioned 0° position and at least one of the aforementioned positions 90° or 270°. All of these preferred position combinations as well as a combination of all three preferred positions are the subject matter of the present invention.

One inventive method variant accepts that for the determination of the flex-work proportional parameter as well as the longitudinal force only half of the time period difference, as occurs in the 90°/270° position combination, is available and that the measuring precision is somewhat smaller. It has the advantage that in a disturbance situation of the sensor pair in the 90° or 270° position the longitudinal force especially important for the slip control can still be determined perfectly. Only the determination of the flex work-proportional parameter is no longer possible. Thus, when one is limited to the use of two sensor pairs, the failure probability of the longitudinal force determination with a position combination that includes the 0° position is as small as possible. In the 90°/270° position combination, on the other hand, the failure of any one of the four sensors would not only make the determination of the flex work-proportional parameter impossible but also of the longitudinal force.

An especially favorable combination of reliability and precision is achieved when the device comprises three sensor pairs, one in the 0° position, the other in the 90° position, and the last one in the 270° position. Such a device should operate such that under normal operating conditions the value(s) as determined at the 90° position and at the 270° position are used, especially displayed and/or used for the control of the brake and forward drive moments, that as a control the values of the position combination 0°/90° and 0°/270° are also determined and compared to the aforementioned ones. When a small threshold value is surpassed, an error indication should occur. Furthermore, the computing unit should be able to detect implausible data and should prevent their use in further processing. Such an advantageous device is able to handle the failure of any of the sensors, when necessary.

The flex work-proportional parameter, independent of it being the wheel spring travel or footprint length or load/pressure ratio, should be determined and upon surpassing a respective limit value a warning signal of too high air pressure should be given to the driver and/or the allowable maximum velocity, optionally external temperature and/or tire-type dependent, should be lowered such that a tire failure caused by too great flex work load is prevented. Since the determination of the flex work-proportional parameter with the torsion deformation determinations by measuring the time period change of marks passing across sensors is cost-favorable, reliable, and surprisingly precise, this solution of the second object allows for a considerable safety gain with limited additional costs. The cost/benefit ratio is substantially more favorable than in known solutions such as air pressure measurement within the rotating wheel with detrimental data transmission problems.

As has been explained above, the flex work proportional parameter, for example, the tire spring travel, is proportional to the ratio between the wheel load and the air pressure. When one of the two parameters, wheel load or air pressure is determined separately, the other value can be determined without further measurement by a simple calculation, i.e., Wheel load=load/pressure ratio x air pressure respectively air pressure wheel=load/load/pressure-ratio with a calibrated proportionality factor.

The separate parameter air pressure is however not of a direct safety interest. However, it is in any case a good service indicator. For this reason, especially because the wheel load can be determined at a non-rotating part, for example, the spring leg, of these two variants the latter one is preferred. The, preferably individual, wheel load determination allows an especially exact determination of the currently present $\mu$ in connection with an inventive longitudinal force determination and thus also an especially fine tuning of the brake, respectively, drive moments.

When the tire pressure is measured in the known manner, then, upon surpassing a limit for the determined wheel load according to the aforementioned equation, a warning in regard to, preferably, too high wheel load or too low air pressure should be given to the driver and/or the allowable maximum velocity, optionally external temperature and/or tire-type dependent, should be lowered such that a tire failure because of too great flex work load is avoided and/or the starting of the vehicle is prevented per se. When in contrast the wheel load is measured in a manner known per se, then, upon falling below a limit for the tire air pressure, determined according to the above equation, a warning should be sent to the driver with regard to too low air pressure and/or the possible maximum velocity, optionally external temperature and/or tire type dependent, should be lowered to such an extent that tire failure because of too great flex work load is prevented.

An inventive device with time period measurement for detecting the torsional deformation requires at each monitored wheel two tracks of marks that can be twisted relative to one another. The radially inner one can, but must not be, arranged at the tire. When it is arranged at the tire, it should be arranged as far as possible radially inwardly. Each mark track must contain at least one, preferably a plurality of marks. Accordingly, the tire must contain at least the outer mark track, preferably in its radially outer area, so that the detected torsional travel based on the time span change is as large as possible and thus also the time span change itself.

The arrangement of the inner marks in the radially inner area of the tire has logistic advantages. Especially it is thus simply and reliably ensured that the inner mark track has the same pitch sequence as the outer, which is especially beneficial when the side decoration is optically sensed, because thus a constant mark differential angle is provided. At least when the detection of passing is optical, the marks should be detectable upon passing of the corresponding sensor by being embodied as projections or depressions. This is also true when changes of sound propagation distances are used for detection.

BRIEF DESCRIPTION OF THE DRAWINGS

The invention will be explained in the following in conjunction with some Figures. It is shown in.

DESCRIPTION OF PREFERRED EMBODIMENTS

Figure 1:
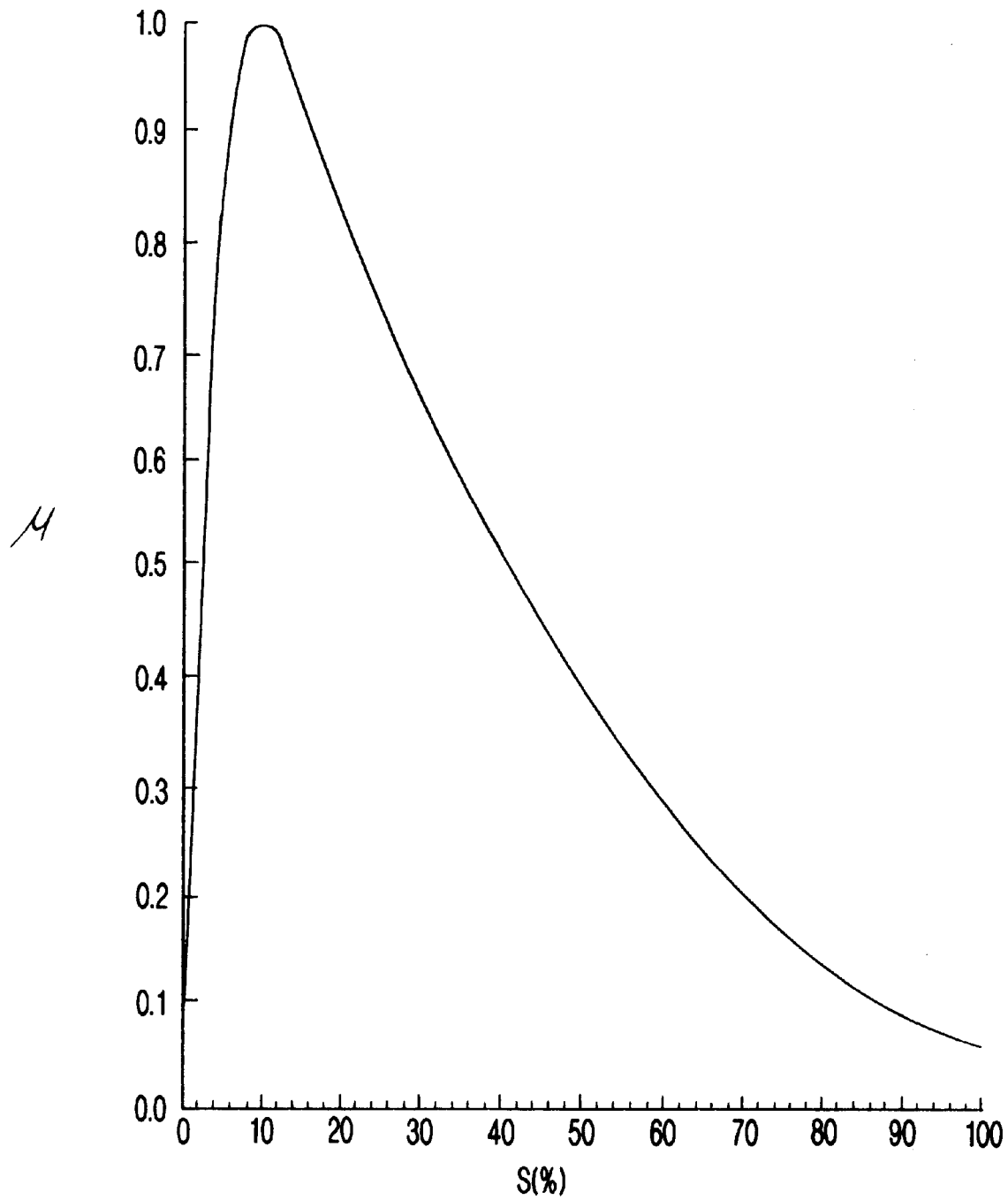
FIG. 1 a curve representing the coefficient of friction as a function of slip ("clip curve")
Figure 2:
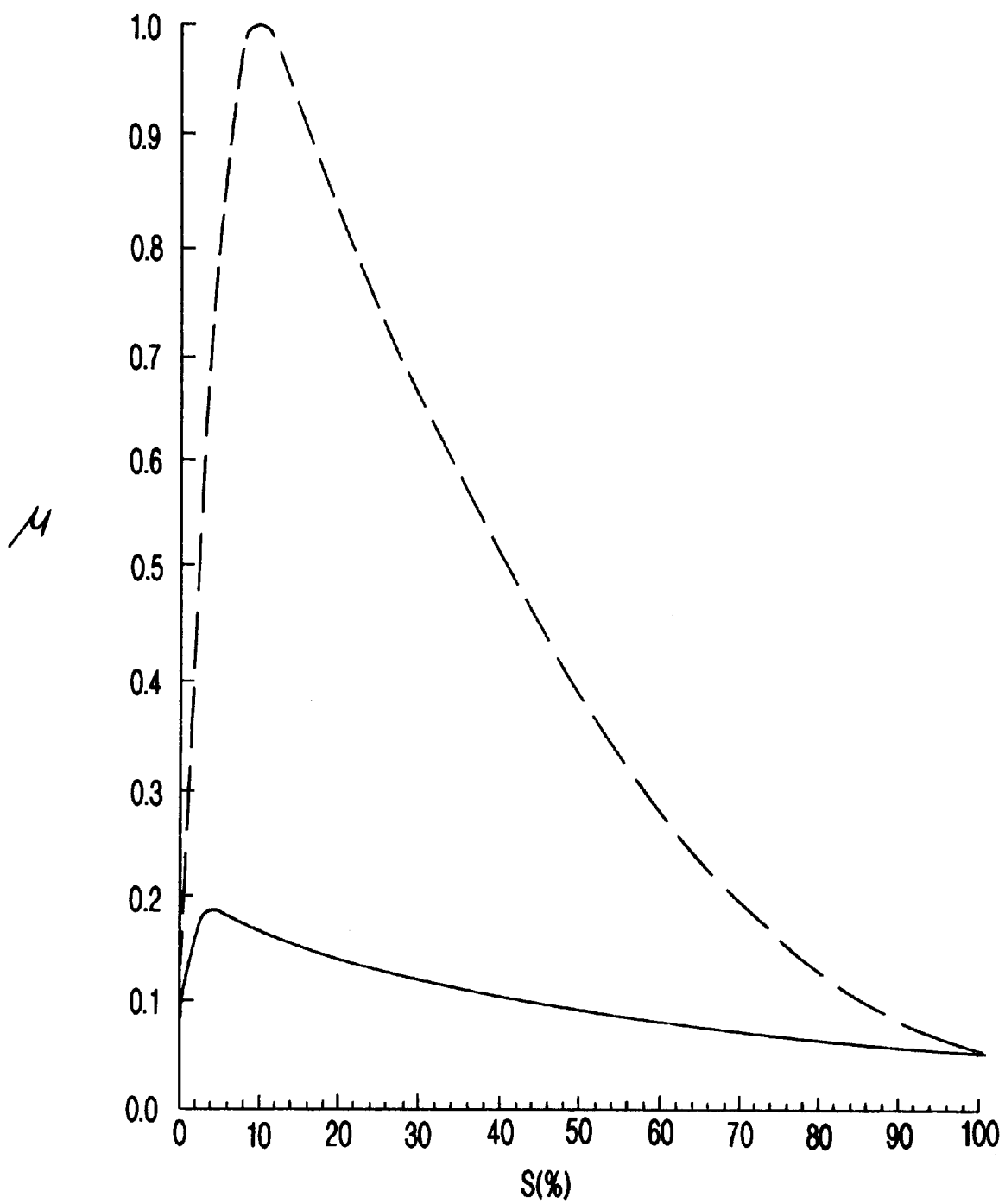
FIG. 2 a representation of the slip curve on ice for the same pairing of materials as in FIG. 1, showing in dashed lines as a comparison the curve of FIG. 1.
Figure 3A:
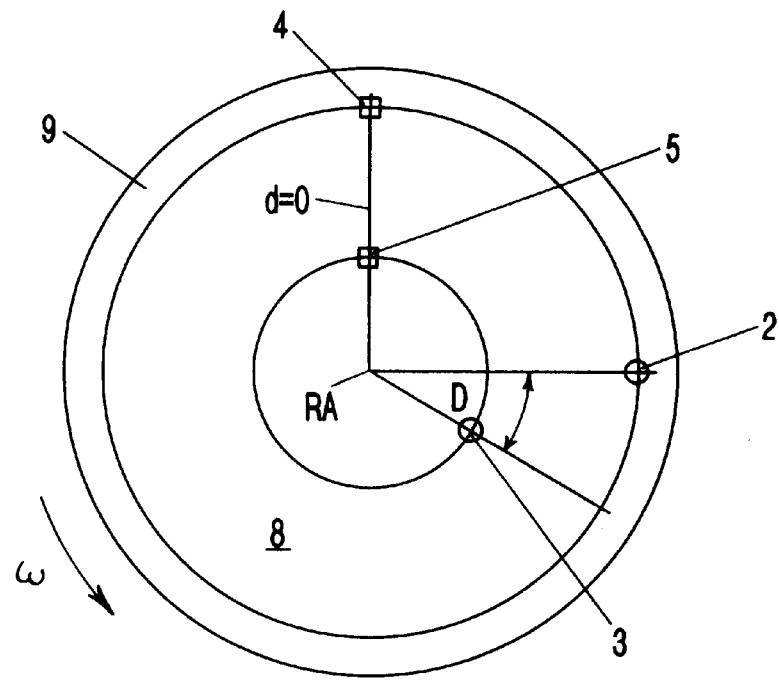
FIGS. 3a–3d in a schematic representation cooperating marks and sensors relative to a wheel.
Figure 3B:
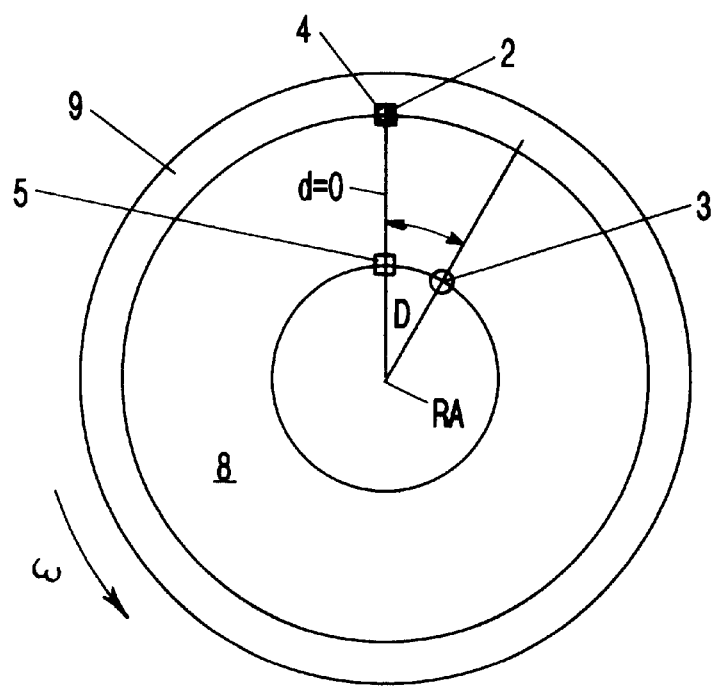
Figure 3C:
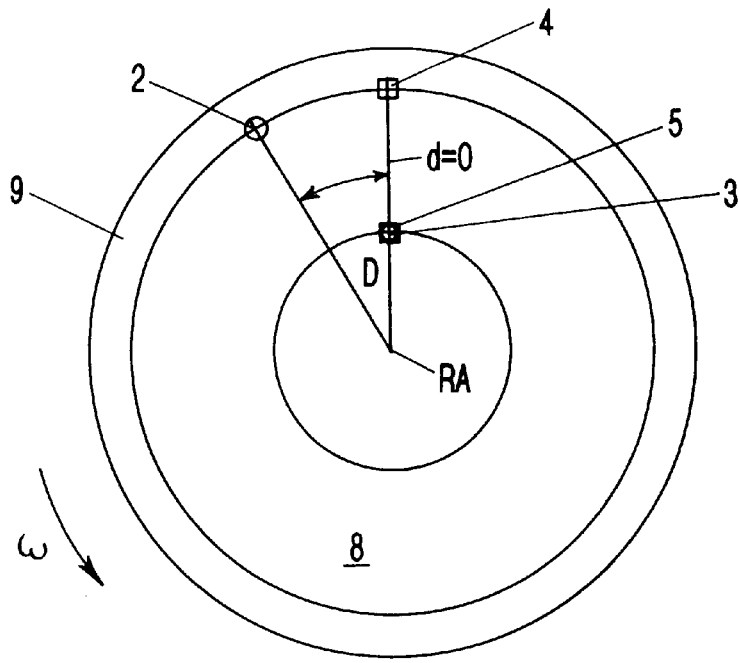
Figure 3D:
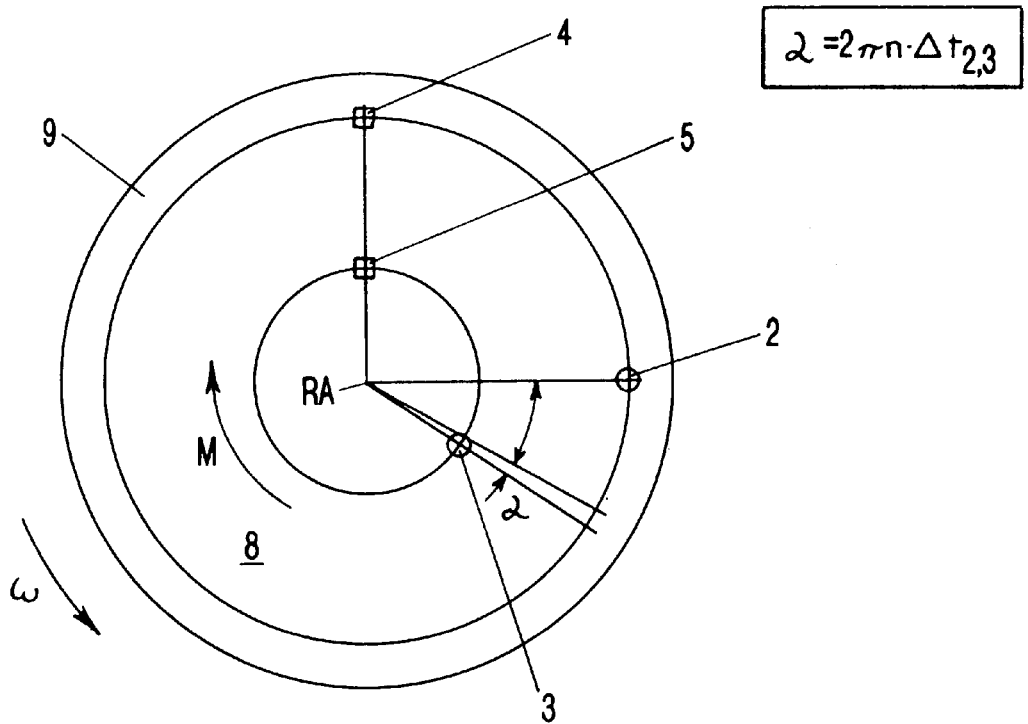
Figure 4:
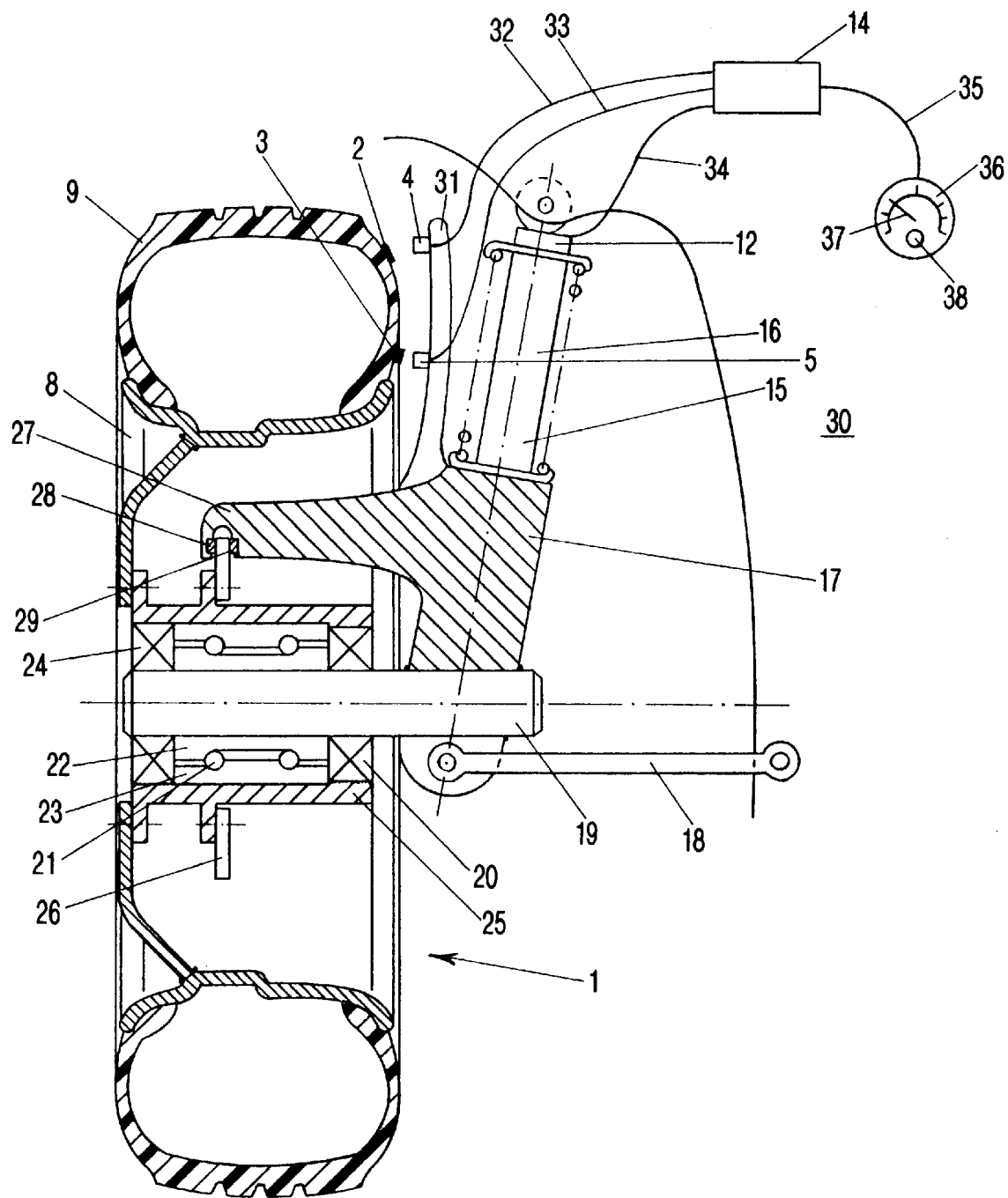
FIG. 4 a section of an inventive McPherson wheel suspension with sensors fixedly connected to the steering knuckle in a 0° position.

FIG. 4 shows a section of the inventive McPherson wheel suspension with a wheel 1, a spring 15, a piston 16, and a cylinder unit 17. The piston 16 is pivotably connected with its upper end to the car body 30.

The steering knuckle 19 is connected with the inner end facing the vehicle to the cylinder unit 17. Here, a transverse suspension arm 18 engages which is pivotably connected to the car body 30. The steering knuckle 19 supports with a wheel bearing 21 a wheel hub 20. The wheel bearing 21 is comprised of an inner ring 22 and an outer ring 23 and is sealed to the right and to the left with a respective sealing ring 24, 25.

A wheel rim 8 is mounted to the wheel hub 20. It supports externally a pneumatic tire 9. Furthermore, at the hub 20 a brake disk 26 is mounted.

A brake caliper 27 with brake pads 28, 29 engages about the brake disk 26. It (27) is fixedly connected to the cylinder unit 17.

At the inner side I of the tire 9 an outer mark 2 and an inner mark 3 are shown.

The sensor carrier 31 which is fixedly connected to the steering knuckle and to the brake caliper 26 comprises an outer sensor 4 and an inner sensor 5.

When the outer mark 2 passes the outer sensor 4, which is connected with a wire 32 to the processing unit 14, a timing device is started, which is preferably electronic and quartz-controlled. When the inner mark 3 passes the inner sensor 5, which is connected with a wire 33 to the processing unit 14, the aforementioned timer is stopped and the time period t 2,3 is measured.

A load cell 12 at the upper end of the piston 16 is connected with a wire 34 to the processing unit 14 for determining the wheel load.

The results of the computing unit 14 are supplied via a wire 35 to the display unit 36. It (36) is preferably arranged within the interior of the vehicle and is comprised of an air pressure display 37 and an ABS control light 38.

Figure 5:
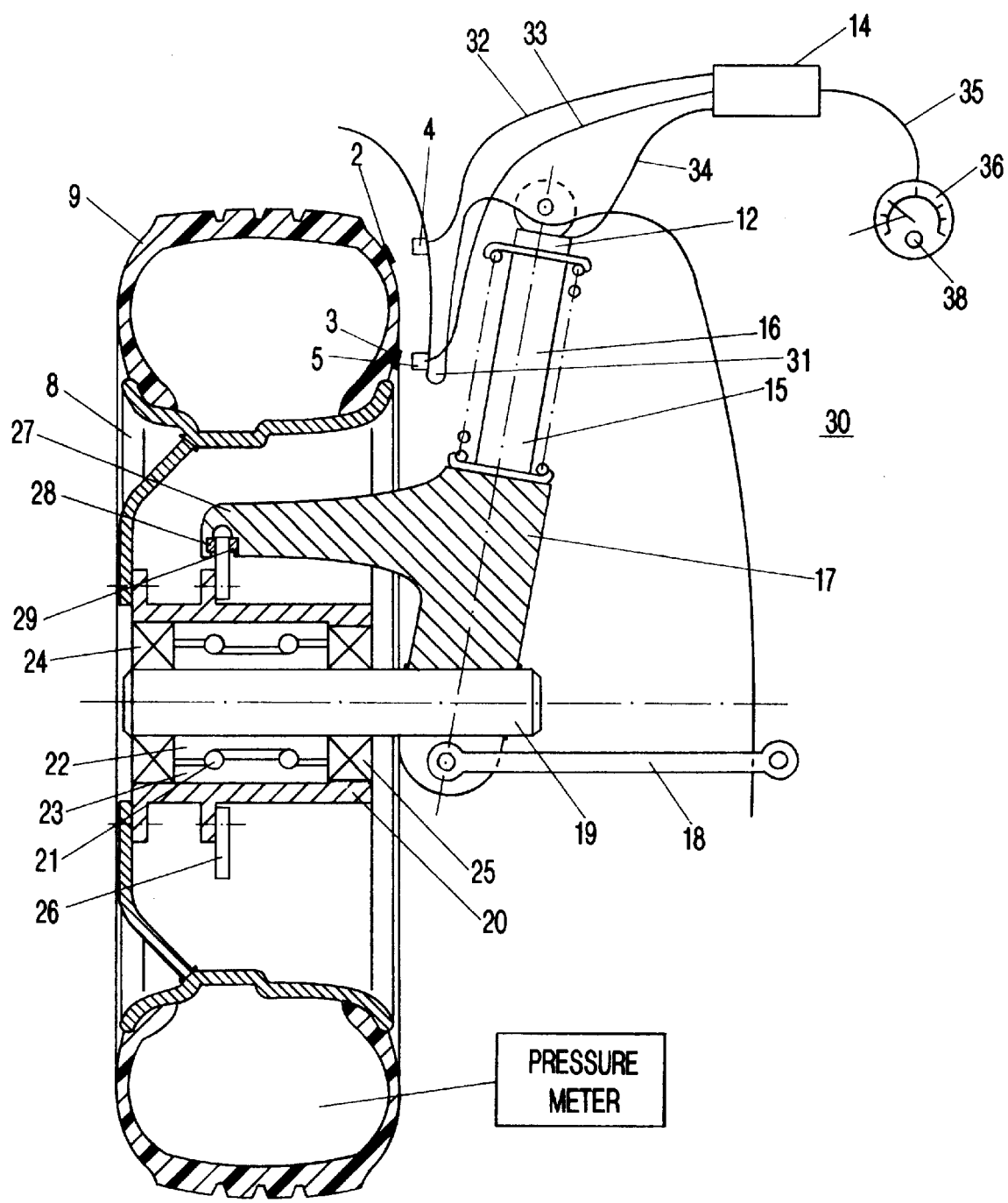
FIG. 5 a section of an inventive McPherson wheel suspension with sensors connected fixedly to the car body in a 0° position.

FIG. 5 shows a section of the inventive McPherson wheel suspension with a spring 15, a piston 16, and a cylinder unit 17.

The piston 16 is pivotably connected with its upper end to the car body 30. The steering knuckle 19 is fixedly connected with its end facing inwardly relative to the vehicle with the cylinder unit 17. A suspension arm 18 engages thereat which is pivotably connected to the car body 30. The steering knuckle 19 supports with a wheel bearing 21 a wheel hub 20. The wheel bearing 21 is comprised of an inner ring 22 and an outer ring 23 and is sealed to the right and to the left with a respective sealing ring 24, 25.

The wheel rim 8 is mounted on the wheel hub 20. It supports externally a pneumatic tire 9. Furthermore, the hub 20 has mounted thereon a brake disk 26.

A brake caliper 27 with brake pads 28, 29 engages about the brake disk 26. It (27) is fixedly connected to the cylinder unit 17.

At the inner side I of the tire 9 an outer mark 2 and an inner mark 3 are shown.

The sensor carrier 31 which is fixedly connected to the car body comprises an outer sensor 4 and an inner sensor 5. Their radial distance is greater than the spring travel.

When the outer mark 2 passes the outer sensor 4, which is connected with wire 32 to the processing unit 14, a timer is started which is preferably electronic and quartz-controlled. When the inner mark 3 passes the inner sensor 5, which is connected with wire 33 to the processing unit 14, the aforementioned timer is stopped and the time period t 2,3 is measured.

A load cell 12 at the upper end of the piston 16 is connected with wire 34 to the processing unit 14 for determining the wheel load.

In analogy to the FIG. 4 the results of the computing unit 14 are supplied via wire 35 to the display unit 36. It (36) is preferably arranged within the interior of the vehicle and is comprised of an air pressure display 37 and an ABS control light 38.

Figure 6:
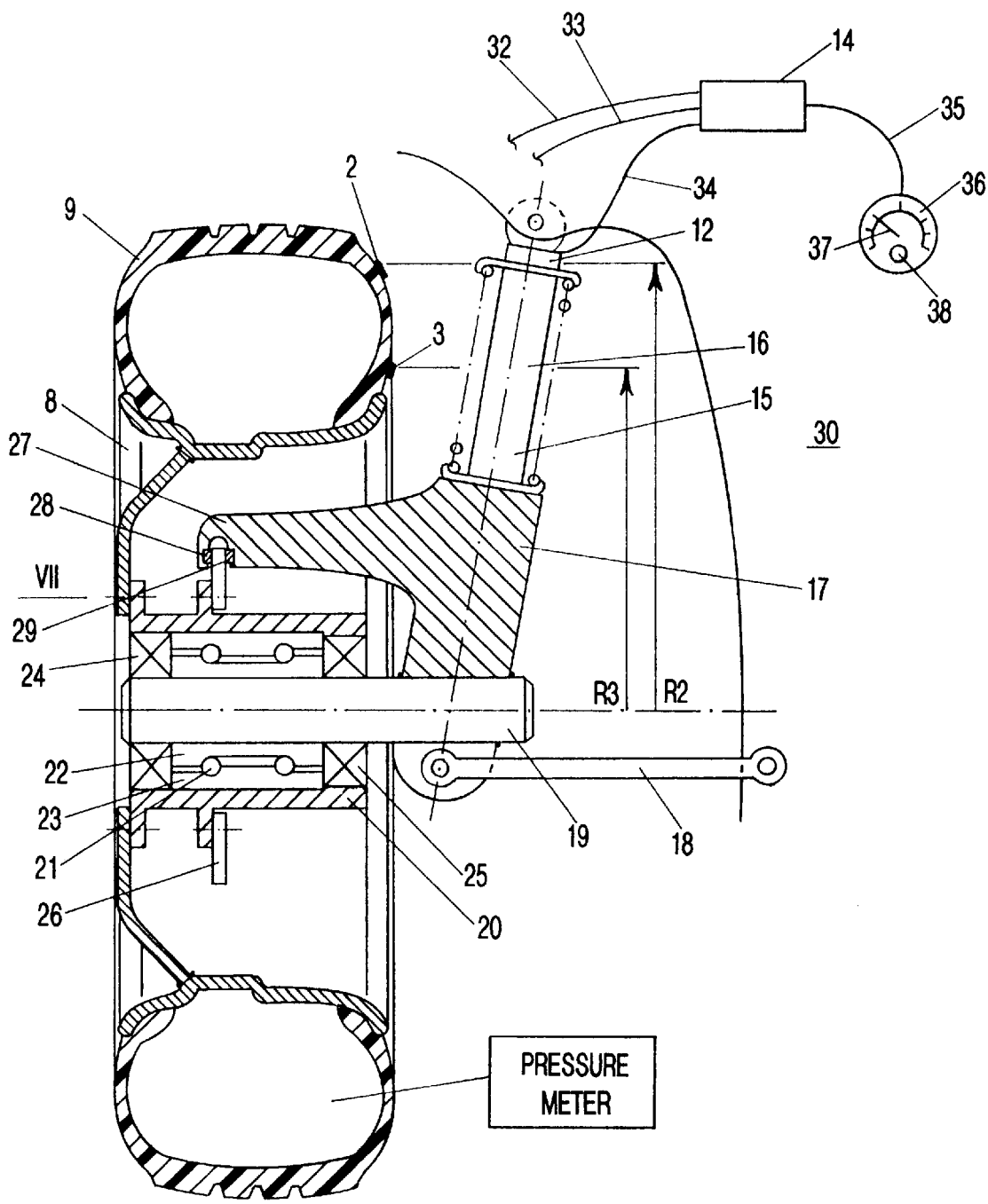
FIGS. 6 & 7 a section of an inventive McPherson wheel suspension with sensors connected to the steering knuckle in the 90° and 270° positions.

FIG. 6 shows a section of an inventive McPherson wheel suspension with a spring 15, a piston 16, and a cylinder unit 17. The piston 16 is pivotably connected with its upper end to the car body 30.

The steering knuckle 19 is connected with its end facing inwardly with respect to the vehicle fixedly to the cylinder unit 17. A transverse suspension arm 18 engages thereat which is pivotably connected to the car body 30. The steering knuckle 19 supports with a wheel bearing 21 a wheel hub 20. The wheel bearing 21 is comprised of an inner ring 22 and an outer ring 23 and is sealed to the right and to the left with a sealing ring 24, 25.

At the wheel hub 20 a wheel flange 8 is mounted. It supports externally a pneumatic tire 9. Furthermore, at the hub 20 a brake disk 26 is mounted.

A brake caliper 27 with brake pads 28, 29 engages about the brake disk 26. It (27) is fixedly connected with the cylinder unit 17.

At the inner side of the tire 9 an outer mark 2 and an inner mark 3 are shown.

The outer mark 2 describes a radius R2 and the inner mark 3 describes the radius R3.

When the outer mark 2 passes the non-represented outer sensor 4, which is connected with a wire 32 to the computing unit 14, a timer is started which is preferably electronic and quartz-controlled. When the inner mark 3 passes the non-represented inner sensor 5 which is connected with a wire 33 to the processing unit 14, the aforementioned timer is stopped and the time period t 2,3 is measured.

With a wire 34 a load cell 12 at the upper end of the piston 16 is connected to the processing unit 14 for determining the wheel load.

Figure 7:
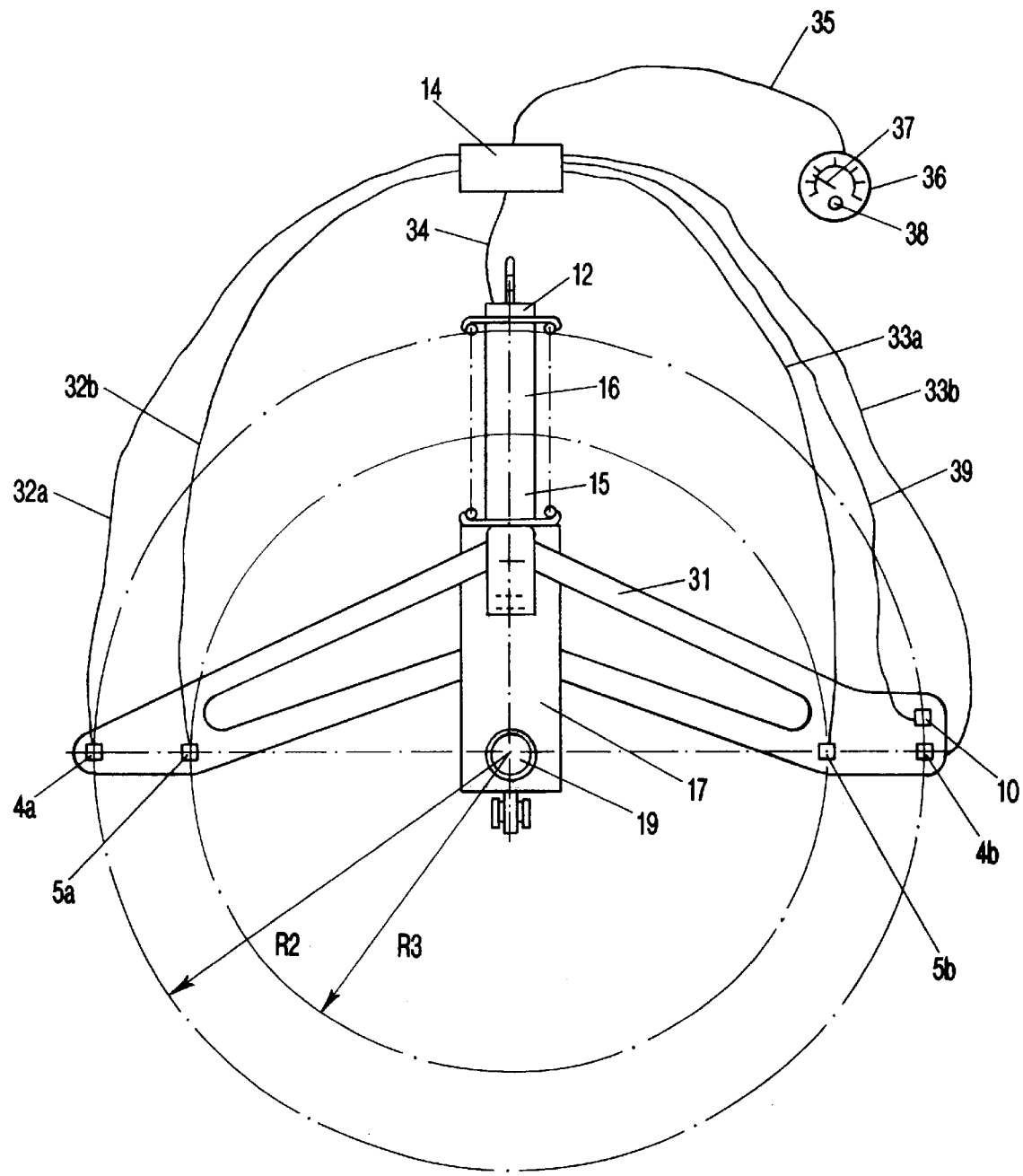

FIG. 7 shows a view of FIG. 6 from the left for showing the arrangement of the sensors 4a, 4b, 5a, 5b and 10.

It shows the spring 15 with piston 16 and cylinder unit 17 to which (17) the sensor carrier 31 is fixedly connected and thus, in turn, is also fixedly connected to the steering knuckle.

The sensor carrier 31 supports two outer sensors 4a and 4b, two inner sensors 5a and 5b, and a sensor 10 which serves for measuring the axial distances.

About the center point of the steering knuckle 19 the inner radius R3, on which the sensor 5a and 5b are arranged, and the outer radius R2, on which the sensors 4a, 4b and 10, are arranged are provided.

The sensors 4a, 4b, 5a, 5b, and 10 are connected with a respective wire 32a, 32b, 33a, 33b and 39 to the processing unit 14.

Load cell 12 at the upper end of the piston 16 is connected with wire 34 to the processing unit 14 for determining the wheel load.

In analogy to the FIGS. 4 through 6 the results of the processing unit 14 are supplied via wire 35 to the display unit 36.

It (36) is preferably arranged within the interior of the vehicle and is comprised of an air pressure display 36 and an ABS control light 38.

Figure 8:
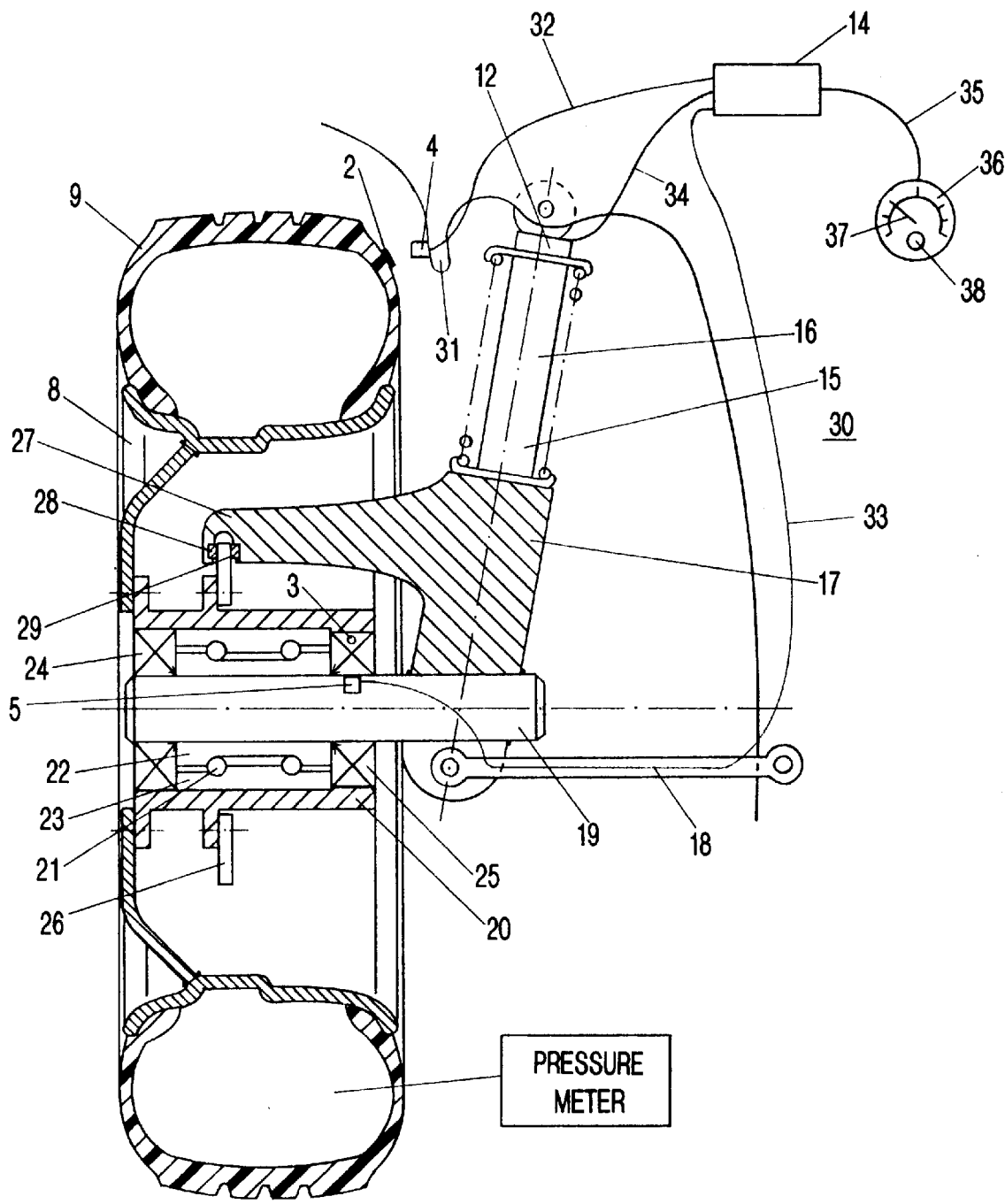
FIGS. 8 & 8a a section of the inventive McPherson wheel suspension with at least one inner sensor arranged in the 0° position directly fixedly connected on the steering knuckle and an outer sensor according to FIG. 5.

FIG. 8 shows a section of an inventive McPherson wheel suspension with a spring 15, a piston 16, and a cylinder unit 17. The piston 16 is pivotably connected with its upper end to a car body 30.

The steering knuckle 19 is connected with its end facing inwardly with respect to the vehicle fixedly to the cylinder unit 17. Here, a transverse suspension arm 18 is provided which is pivotably connected to the car body 30. The steering knuckle 19 supports a wheel bearing 21 with a wheel hub 20. The wheel bearing 21 is comprised of an inner ring 22 and an outer ring 23 and is sealed to the right and to the left with a sealing ring 24, 25.

At the wheel hub 20 a wheel rim 8 is mounted. It supports externally a pneumatic tire 9. Furthermore, on the hub 20 a brake disk 26 is mounted.

A brake caliper 27 with brake pads 28, 29 engages about the brake disk 26. It (27) is fixedly connected to the cylinder unit 17.

At the inner side I of the tire 9 an outer mark 2 is shown. Preferably, as in all previous Figures, the tire comprises for better resolution a plurality of marks which, however, in the shown representation are not visible.

Figure 8A:
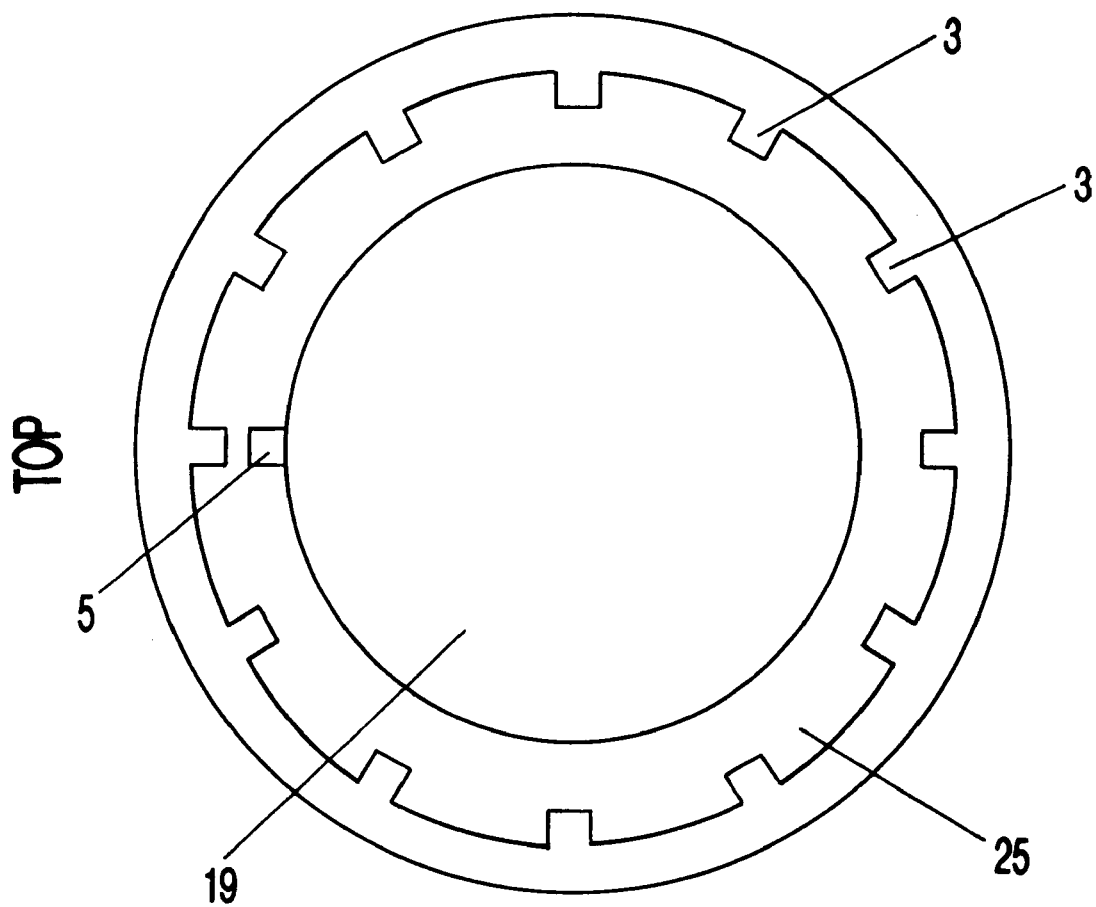

Furthermore, an inner mark 3 is provided at the sealing ring 25. Of course, a plurality thereof is preferably present, as in the other embodiments. Furthermore, the number of inner marks preferably coincides with the number of outer marks. The plurality of inner marks is shown in FIG. 8a which will be explained later.

The sensor carrier 31 which is fixedly connected to the car body 30 comprises an outer sensor 4. The inner sensor 5 is fastened to the steering knuckle 19.

When the outer mark 2 passes the outer sensor 4, which is connected via wire 32 to the processing unit 14, a timer which is preferably electronic and quartz-controlled is started. When the inner mark 3 passes the inner sensor 5, which is connected via wire 33 to the processing unit 14, the aforementioned timer is stopped and the time period t 2,3 is measured.

A load cell 12 at the upper end of the piston 16 is connected with wire 34 to the processing unit 14 for determining the wheel load.

In analogy to FIGS. 4 through 7, the results of the processing unit 14 are supplied via wire 35 to the display unit 36. It (36) is preferably arranged in the interior of the vehicle and is comprised of an air pressure display 37 and an ABS control light 38.

FIG. 8a shows the sealing ring in a view from the inner side of the vehicle. The sealing ring contains a sheet metal ring with inner teeth the tooth-shape projections of which in the radially inward direction are used as inner marks 3. They are detected by an inner sensor or inner sensors 5, in the shown embodiment only one directly connected to the steering knuckle 19 so as to be rotationally fixed. The sheet metal ring which provides the marks is preferably, as shown in the embodiment, vulcanized to the sealing ring 25 so that it cannot be lost.

Figure 9:
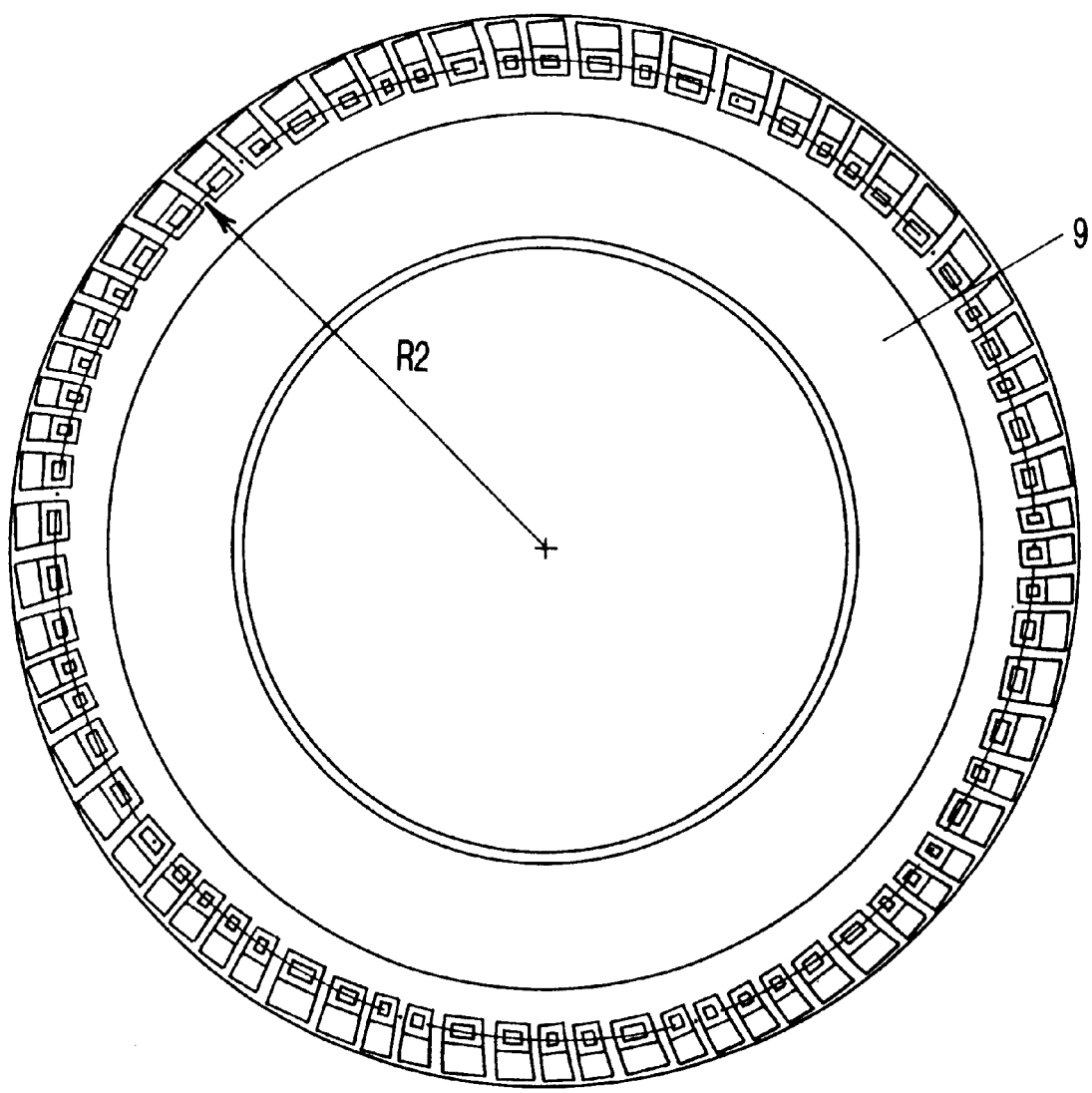
FIG. 9 an inventive tire with a side decoration the transverse grooves of which are used as outer marks.

FIG. 9 shows the inventive tire 9 in a side view. The circular arc R2 describes the position of the marks which are distributed at the decoration.

Figure 10:
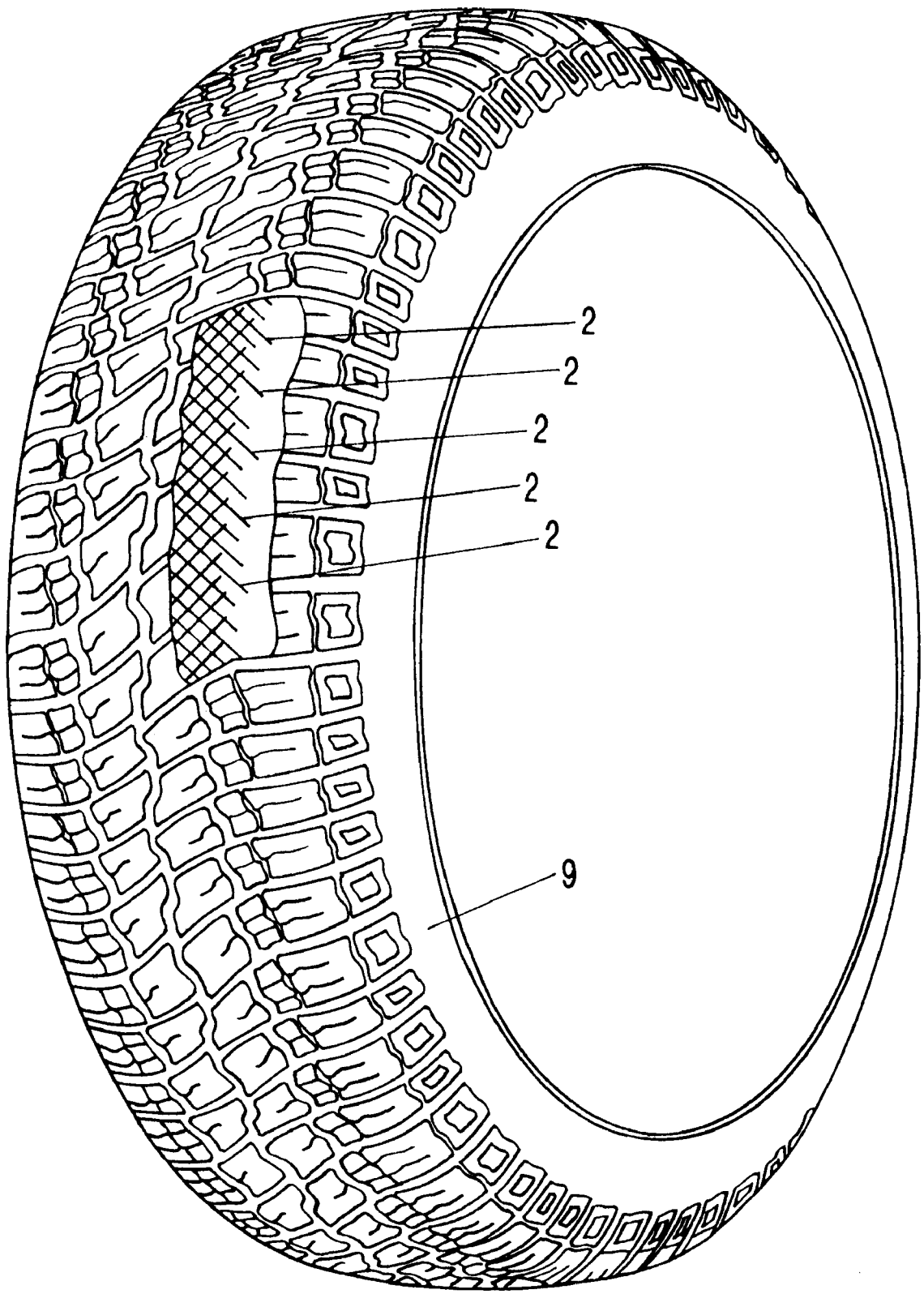
FIG. 10 an inventive tire with a belt edge at the inner side facing the vehicle with individual projecting wire ends that thus differ from the surroundings and are detectable.

FIG. 10 shows a perspective view of an inventive tire 9 with exposed belt edges. The marks 2 are represented here as wire ends of the lower belt layer that project outwardly in a regular sequence. The projecting ends should not project from the rubber, as shown here.

The present invention is, of course, in no way restricted to the specific disclosure of the specification and drawings, but also encompasses any modifications within the scope of the appended claims.

We claim:

1. A method for determining a longitudinal force acting during tire rotation on a tire mounted on a wheel rim, said method comprising the steps of:
   A) determining the torsional deformation of the tire, which is a function of the location of measurement, between a radially inner area of the wheel or the hub and a radially outer area of the tire in at least one position by the steps of:
   1) positioning at least two marks at the wheel on different radii relative to an axis of rotation of the wheel, wherein a radially outer mark is positioned on a radially outer area of the tire;
   2) arranging at least two sensors non-rotatingly in the vicinity of the wheel so as to be positioned on the different radii;
   3) recording for the rotating wheel at least one time period between passing of the at least two marks at the at least two sensors;
   4) computing the torsional deformation from the at least one time period;
   B) calculating the longitudinal force from the torsional deformation.

2. A method according to claim 1, further comprising the step of determining the wheel load acting on the tire from the torsional deformation of the tire determined at least at two non-rotating positions.

3. A method according to claim 1, wherein said step A) 3) includes detecting at the radially outer area of the tire at least one first point in time at which the at least one mark at the tire passes the at least one outer non-rotating sensor; detecting at the radially inner area of the wheel at least one second point in time at which the at least one mark at the wheel passes the at least one inner non-rotating sensor; and measuring the time period between said first and second points in time; said method further comprising the step of processing the time period, wherein the time period is divided by a period length identical to an amount of time of one revolution of the wheel or a fraction thereof.

4. A method according to claim 3, wherein the step of detecting the first point in time triggers beginning of the step of measuring the time period and wherein the step of detecting the second point in time triggers stopping of the step of measuring.

5. A method according to claim 3, wherein the step of detecting the second point in time triggers beginning of the step of measuring the time period and wherein the step of detecting the first point in time triggers stopping of the step of measuring.

6. A method according to claim 3, wherein:
   the step of detecting the first point in time triggers beginning of the step of measuring a first one of the time periods and the step of detecting the second point in time triggers stopping of the step of measuring;
   the step of detecting the second point in time triggers beginning of the step of measuring a second one of the time periods and wherein the step of detecting the first point in time triggers stopping of the step of measuring;
   one of the first and second time periods is given a negative sign and the other is given a positive sign;
   in said step of processing that one of the first and second time periods is used that has a smaller absolute value.

7. A method according to claim 3, wherein:
   the marks form a mark pair consisting of an inner mark at the radially inner area and an outer mark at the radially outer area, each mark positioned in a phase plane, defined as a plane containing the axis of rotation of the wheel in which plane the respective mark is positioned, the inner and outer marks of the mark pair having a differential angle relative to one another, the differential angle defined between the phase plane of the inner mark and the phase plane of the outer mark;
   the sensors form a sensor pair consisting of an inner sensor at the radially inner area and an outer sensor at the radially outer area, each sensor positioned in a position plane, defined as a plane containing the axis of rotation of the wheel in which plane the respective sensor is non-rotatingly positioned, the inner and outer sensors of the sensor pair having a differential angle relative to one another, the differential angle defined between the position plane of the inner sensor and the position plane of the outer sensor;
   for preventing time periods of different signs, the differential angle of the mark pair deviates from the differential angle of the sensor pair by at least the torsional angle between the outer and inner areas under maximum load of the wheel;

one of the inner and outer marks of the mark pair triggers measuring of the time period and the other one of the inner and outer marks of the mark pair stops measuring of the time period.

8. A method according to claim 7, wherein the differential angle of the mark pair is zero.

9. A method according to claim 7, wherein the differential angle of the sensor pair is zero.

10. A method according to claim 7, wherein a plurality of mark pairs are provided on the wheel and wherein each sensor pair measures per revolution of the wheel all time periods between passing of the inner and outer marks of each mark pair.

11. A method according to claim 7, wherein all mark pairs have the same differential angle.

12. A method according to claim 7, wherein the mark pairs are distributed about the wheel circumference at different spacings to one another.

13. A method according to claim 7, wherein a plurality of said sensor pairs are arranged non-rotatingly in different position planes in the vicinity of the wheel and wherein each mark pair causes each sensor pair to measure the time period between passing of the inner and outer marks.

14. A method according to claim 13, wherein a position vertical above the axis of rotation is defined as 0° and wherein other positions are designated according to their angle in the wheel rotation direction relative to the 0° position, wherein two sensor pairs are provided, wherein a first sensor pair is positioned at a 90° or 270° position and a second sensor pair is positioned oppositely at a 90° or 270° position, wherein the time periods measured in the two opposite positions are added to one another and the resulting time period sum is used to calculate, according to an empirically known equation of tire longitudinal force as a function of the time period sum or the tire distortion angle in the 90° and 270° positions, the value of the tire longitudinal force.

15. A method according to claim 14, wherein the time periods measured in the two opposite positions are subtracted from one another and the resulting time period difference is used to calculate, according to the empirically known equation of tire spring travel in the footprint or the footprint length as a function of the time period difference or the tire distortion angle in the 90° and 270° positions, the value of at least one of the parameters tire spring travel or footprint length or load/pressure ratio.

16. A method according to claim 13, further including the steps of:
measuring the tire air pressure with a rotating pressure meter at the wheel, said pressure meter having a radio transmission unit for transmitting measured data to a non-rotating processing unit;
determining the wheel load from the measured air pressure and the load/pressure ratio.

17. A method according to claim 16, further comprising the steps of:
upon surpassing a wheel load limit, giving the driver a warning in regard to too great wheel load of too little tire air pressure; and/or
lowering the maximum driving velocity, while taking into consideration exterior temperature and/or tire type, to such an extent that tire failure due to too great flex work load is prevented; and/or
preventing starting of the vehicle.

18. A method according to claim 13, further including the steps of:
measuring the wheel load with a known device at a suspension spring;
determining the tire air pressure from wheel load and the load/pressure ratio.

19. A method according to claim 18, comprising the steps of:
when the air pressure falls below a pressure limit, giving the driver a warning in regard to too low tire air pressure; and/or
lowering the maximum driving velocity, while taking into consideration exterior temperature and/or tire type, to such an extent that tire failure due to too great flex work load is prevented.

20. A method according to claim 13, further including the step of storing the tire distortion as a function of tire spring travel or a footprint length or a load/pressure ratio and the tire longitudinal force, wherein the time periods measured and divided by the period length is a value for the tire distortion.

21. A method according to claim 13, wherein the tire spring travel or a footprint length or a load/pressure ratio is determined, further including the steps of:
comparing the tire spring travel or footprint length or load/pressure ratio to a limit value;
when the limit is surpassed, giving the driver a warning in regard to too low tire air pressure and/or lowering the maximum driving velocity, while taking into consideration exterior temperature and/or tire type, to such an extent that tire failure due to too great flex work load is prevented.

22. A method according to claim 3, wherein a position vertical above the axis of rotation is defined as 0° and wherein other positions are designated according to their angle in the wheel rotation direction relative to the 0° position, wherein said sensors are arranged in pairs and a first sensor pair is arranged in the 0° and the time period measured in the 0° position, which is substantially independent of the tire spring travel and the footprint length, is used to calculate the value of the tire longitudinal force according to the empirical equation of the tire longitudinal force as a function of the time period or the tire distortion angle in the 0° position.

23. A method according to claim 22, wherein a second sensor pair is positioned in the 90° or the 270° position, wherein time periods measured by the first and second sensor pairs approximately simultaneously are processed by the following steps:
calculating the current tire longitudinal force according to the empirical equation of the tire longitudinal force as a function of the time period or the tire distortion angle from the time period measured in the 0° position;
subtracting the time period measured in the 90° or 270° position from the time period measured in the 0° position and determining the absolute value of the resulting time period difference;
calculating the value of tire spring travel or footprint length or load/pressure ratio from the resulting time period difference according to the empirically known equation of tire spring travel in the footprint or the footprint length or the load/pressure ratio as a function of the time period or the tire distortion angle.

24. A method according to claim 1, wherein a position vertical above the axis of rotation is defined as 0° and wherein other positions are designated according to their angle in the wheel rotation direction relative to the 0° position, further including the step of:

at the 0° position and at the 90° or 270° position providing a respective non-rotating sensor capable of measuring an axial distance between the sensor and the passing marks;

determining from the measured pairs of axial distances a transverse force acting on the tire.

25. A method according to claim 1, wherein in said step A) 2) a radially inwardly arranged sensor is connected to a steering knuckle and a radially outwardly arranged sensor is connected to a transverse suspension arm of the wheel suspension.

26. A method for determining a tire spring travel or a footprint length or a load/pressure ratio during tire rotation, said method comprising the steps of:
   A) determining the torsional deformation of the tire, which is a function of the location of measurement, between a radially inner area of the wheel and a radially outer area of the tire in at least two positions, wherein at least one of said two positions is not vertically above or below an axis of rotation of the wheel, by the steps of:
      1) positioning at least two marks at the wheel on different radii relative to an axis of rotation of the wheel, wherein a radially outer mark is positioned on a radially outer area of the tire;
      2) arranging at least two sensors non-rotatingly in the vicinity of the wheel so as to be positioned on the different radii;
      3) measuring for the rotating wheel at least one time period between passing of the at least two marks at the at least two sensors;
      4) computing the torsional deformation from the at least one time period;
   B) calculating the tire spring travel or the footprint length or the load/pressure ratio from the torsional deformation.

27. A method according to claim 26, wherein a position vertical above the axis of rotation is defined as 0° and wherein other positions are designated according to their angle in the wheel rotation direction relative to the 0° position, wherein the sensors form sensor pairs, wherein a first sensor pair is positioned at a 90° or 270° position and a second sensor pair is positioned oppositely at a 90° or 270° position, wherein the time periods measured in the two opposite positions are subtracted from one another and the resulting time period difference is used to calculate, according to the empirically known equation of tire spring travel in the footprint or the footprint length as a function of the time period difference or the tire distortion angle in the 90° and 270° positions, the value of tire spring travel or footprint length or load/pressure ratio.

28. A method according to claim 26, wherein in said step A) 2) a radially inwardly arranged sensor is connected to a steering knuckle and a radially outwardly arranged sensor is connected to a transverse suspension arm of the wheel suspension.

29. A device for determining any of the tire parameters, acting during tire rotation on a tire mounted on a wheel rim, selected from the group consisting of a longitudinal force, a tire spring travel, a footprint length, and a load/pressure ratio, said device comprising:
   at least one first mark connected to the tire on a radially outer area of the tire at a first radius relative to the axis of rotation of the wheel;
   at least one second mark provided at the wheel in a radially inner area of the wheel at a second radius relative to the axis of rotation of the wheel;
   at least one first sensor non-rotatingly arranged at the first radius relative to said axis of rotation for recognizing passing of said at least one first mark;
   at least one second sensor non-rotatingly arranged at the second radius relative to said axis of rotation for recognizing passing of said at least one second mark;
   a measuring unit, operatively connected to said at least one first and second sensors, for measuring at least one time period between passing of said at least one first and second marks;
   a processing unit for determining from the at least one time period any of said tire parameters.

30. A device according to claim 29, wherein said at least one second mark is connected to a wheel component selected from the group consisting of a wheel rim flange and a hub.

31. A device according to claim 29, wherein said at least one second mark is provided in the area of the tire bead.

32. A device according to claim 29, wherein said processing unit comprises a circuit for dividing the at least one time period by a corresponding measured period length to determine thereby a local torsional angle between said at least one first and second marks at locations determined by said at least one first and second sensors, said processing unit further comprising a data storage unit in which the equations for said tire parameters as a function of said torsional angle are stored, wherein said processing unit calculates the desired one of said tire parameters based on the determined torsional angles.

33. A device according to claim 29, wherein said at least one first mark is displaced relative to said at least one second mark in a circumferential direction of the tire.

34. A device according to claim 29, wherein said at least one first sensor responds to magnetic flux density changes.

35. A device according to claim 34, wherein the tire to be monitored has at least one belt ply consisting of steel cords, said at least one belt ply having a cut edge at a side of the tire facing inwardly relative to the vehicle, wherein at least one of the steel cords has a free end projecting axially inwardly and functioning as said at least one first mark.

36. A device according to claim 35, wherein every third steel cord has a free end functioning as said at least one first mark.

37. A device according to claim 29, wherein said at least one first sensor responds to a change of light reflection, wherein the tire to be monitored has an inner tire side facing axially inwardly relative to the vehicle, wherein the inner tire side has a tire tread profiling or shoulder profiling with at least one transverse groove not extending in a circumferential direction of the tire, wherein said at least one transverse groove is said at least one first mark.

38. A device according to claim 29, having a fist operational state in which, at a substantially constant vehicle velocity, a phase position of said first marks relative to one another or relative to one another and said at least one second mark is detected and stored in said processing unit.

39. A device according to claim 29, having a first operational state in which, at a substantially constant vehicle velocity, a phase position of said at least one first mark relative to said at least one second mark is detected and stored in said processing unit.

40. A device according to claim 29, wherein a number of said first marks differs from a number of said second marks, wherein said processing unit includes a selection program and wherein said selection program, for forming mark pairs consisting of one of said first marks and one of said second marks, selects the most suitable ones of said first and second marks for forming said mark pairs.

41. A device according to claim 29, wherein said first marks and said second marks form mark pairs, consisting of one of said first marks and one of said second marks, and wherein a differential angle between phase positions of said first and second marks of each one of said mark pairs is identical for all of said mark pairs or different wherein for different differential angles said processing unit includes a statistical evaluation program for measuring and storing the different differential angles in order to correct the measured time period therewith.

42. A device according to claim 41, wherein said mark pairs are distributed in a circumferential direction of the tire at different spacings to one another.

43. A device according to claim 29, wherein said at least one first sensor and said at least one second sensor form sensor pairs, consisting of one of said first sensor and one of said second sensors, and wherein at least one of said sensor pairs is positioned in a 0° position defined as vertically above the wheel axis wherein, when two of said sensor pairs are provided, a second one of said sensor pairs, relative to said sensor pair positioned in said 0° position, is positioned in a 90° or a 270° position defined in the wheel rotation direction;

wherein, when three of said sensor pairs are provided, a second and a third one of said sensor pairs, relative to said sensor pair positioned in said 0° position, are positioned in a 90° and a 270° position, respectively.

44. A device according to claim 43, wherein a plurality of said sensor pairs is provided in a circumferential direction of the wheel.

45. A device according to claim 29, wherein said at least one first sensor and said at least one second sensor form sensor pairs, consisting of one of said first sensors and one of said second sensors, and wherein one of said sensor pairs is positioned in 90° position and a second one of said sensor pairs in a 270° position, relative to a 0° position defined as vertically above the wheel axis.

46. A device according to claim 29 for determining the load/pressure ratio, further comprising a tire air pressure measuring device wherein said processing unit is connected to said tire air pressure measuring device for calculating the tire air pressure.

47. A device according to claim 29 for determining the load/pressure ratio, further comprising a wheel load measuring device wherein said processing unit is connected to said wheel load measuring device for calculating the wheel load.

48. A device according to claim 29 for determining the load/pressure ratio, said device having means for generating a warning for the driver or limiting the maximum velocity when a vehicle-specific limit of the load/pressure ratio is surpassed.

49. A device according to claim 29 for determining the load/pressure ratio, said device having means for generating a warning for the driver and limiting the maximum velocity when a vehicle-specific limit of the load/pressure ratio is surpassed.

50. A device according to claim 29, wherein a position vertical above the axis of rotation is defined as 0° and wherein other positions are designated according to their angle in the wheel rotation direction relative to the 0° position, wherein at least one distance-measuring sensor is provided in a 90° position or in the 270° position at said first radius relative to the axis of rotation of the wheel, wherein a transverse force at the tire is determined by said processing unit from an axial distance measured with said distance-measuring sensor.

51. A device according to claim 50, wherein a further distance-measuring sensor is provided in the 0° position, wherein each one of said distance-measuring sensors is combined with one of said first sensors to a common sensing unit, wherein the transverse force at the tire is determined by said processing unit from axial distances measured with said distance-measuring sensors.

* * * * *